(12) United States Patent
Weiner et al.

(10) Patent No.: US 9,252,823 B2
(45) Date of Patent: Feb. 2, 2016

(54) PHASE COMPENSATION FILTERING FOR MULTIPATH WIRELESS SYSTEMS

(71) Applicant: Purdue Research Foundation, West Lafayette, IN (US)

(72) Inventors: Andrew M. Weiner, West Lafayette, IN (US); Amir Dezfooliyan, Berkeley, CA (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 0 days.

(21) Appl. No.: 14/453,573

(22) Filed: Aug. 6, 2014

(65) Prior Publication Data

US 2015/0072624 A1    Mar. 12, 2015

Related U.S. Application Data

(60) Provisional application No. 61/862,597, filed on Aug. 6, 2013.

(51) Int. Cl.
    *H04B 1/10*           (2006.01)
    *H04B 1/04*           (2006.01)

(52) U.S. Cl.
    CPC ............ *H04B 1/1081* (2013.01); *H04B 1/0475* (2013.01)

(58) Field of Classification Search
    CPC ............................ H04B 1/0475; H04B 1/1081
    USPC ............... 455/65, 77, 67.14, 115.1, 139, 103, 455/102, 213; 375/285, 263, 222, 29, 296, 375/260; 348/21, 192; 704/264
    See application file for complete search history.

(56) References Cited

U.S. PATENT DOCUMENTS

| | | | | | |
|---|---|---|---|---|---|
| 4,631,538 | A | * | 12/1986 | Carreno | G08C 15/00 340/870.18 |
| 5,996,415 | A | * | 12/1999 | Stanke | G01N 29/041 374/119 |
| 6,647,070 | B1 | * | 11/2003 | Shalvi | H04L 25/497 375/263 |
| 2002/0097335 | A1 | * | 7/2002 | Kobayashi | H04N 9/8042 348/384.1 |
| 2002/0168020 | A1 | * | 11/2002 | Justice | H04L 27/0014 375/295 |
| 2003/0118143 | A1 | * | 6/2003 | Bellaouar | H03C 3/0925 375/376 |
| 2003/0135374 | A1 | * | 7/2003 | Hardwick | G10L 13/02 704/264 |
| 2005/0141624 | A1 | * | 6/2005 | Lakshmipathi | H04B 7/0408 375/260 |

(Continued)

OTHER PUBLICATIONS

Dezfooliyan, A. et al., Evaluation of Time Domain Propagation Measurements of UWB Systems Using Spread Spectrum Channel Sounding, IEEE Transactions on Antennas and Propagation, vol. 60, No. 10, 4855-4865 (2012).

(Continued)

*Primary Examiner* — Tan H Trinh
(74) *Attorney, Agent, or Firm* — Purdue Research Foundation

(57) ABSTRACT

A wireless communication system is disclosed. The system includes a transmitter which includes a data source configured to provide data to be transmitted, a modulator configured to modulate the data, a pre-filter configured to apply a filter to the modulated data generating pre-filtered data, and a transmitter antenna configured to receive the pre-filtered data and to transmit the pre-filtered data, the pre-filter based on a phase compensation topology that is based on channel characteristics between the transmitter and a receiver, the frequency response of the pre-filter based on spectral phase information of the channel such that the frequency response at the receiver is proportional to the magnitude of the channel frequency response.

27 Claims, 17 Drawing Sheets

(56) References Cited

U.S. PATENT DOCUMENTS

| | | | | |
|---|---|---|---|---|
| 2006/0089109 | A1* | 4/2006 | Lee | H04B 17/21 455/103 |
| 2006/0182015 | A1* | 8/2006 | Kim | H04L 27/2657 370/203 |
| 2010/0226416 | A1* | 9/2010 | Dent | H04L 25/0202 375/219 |
| 2011/0126038 | A1* | 5/2011 | Korba | H02J 3/24 713/401 |
| 2011/0222621 | A1* | 9/2011 | Christensen | H04B 5/00 375/271 |

OTHER PUBLICATIONS

Molisch, A. F., et al., A Comprehensive Standardized Model for Ultrawideband Propagation Channels. IEEE Transactions on Antennas and Propagation, vol. 54, No. 11, 3151-3166 (2006).

Ishiyama Y., Ohtsuki T.: "Performance comparison of UWB-IR using rake receiver in UWB channel models." International Workshop on UWB Systems, 2004, pp. 226-230.

Rajeswaran A., et al, "Rake performance for a pulse based UWB system in a realistic UWB indoor channel," IEEE International Conference on Communications, ICC'03, 2003, vol. 4, pp. 2879-2883, Anchorage, AK, U.S.A.

Fink M., et al., "Self focusing in inhomogeneous media with time reversal acoustic mirrors." IEEE Ultrasonics Sysmp., 1989, vol. 1, pp. 681-686, Montreal, Canada.

Tesserault G., Malhouroux N., Pajusco P.: 'Determination of material characteristics for optimizing WLAN radio', IEEE European conf on wireless technologies, 2007, pp. 225-228.

Muqaibel, A. et al.: "Path-Loss and Time Dispersion Parameters for Indoor UWB Propagation." IEEE Transactions on Wireless Communications, vol. 5, No. 3, 550-559 (2006).

Monsef F., et al., "Effectivenss of time-reveral technique for UWB wireless communications in standard indoor environments," ICECom Conf. Proc. 2010.

Zhou, C., et al., "Experimental results on multiple-input single-output (MIST) time reveral for UWB systems in an office environment." Proc. MILCOM, Washington DC, 2006.

Oestges, C., et al., "Time reversal techiques for broadband wireless communication systems," European Microwave Conference (Workshop), Amsterdam, The Netherlands, Oct. 2004, pp. 49-66.

Abbasi-Moghadam, D., Tabataba V., "Channel characterization of time reversal UWB communication systems," Springer Ann. Telecommun. 2010, vol. 65, No. 9-10, pp. 601-614.

Love D. J., Heath R. W.: 'Equal gain transmission in multiple-input multiple output wireless systems', IEEE Trans. on Comm., 2003, vol. 51, pp. 1102-1110.

Nguyen H. et al., "Preequalizer design for spatial multiplexing SIMO-UWB TR systems," IEEE Trans. on Vehicular Tech., 2010, vol. 59, No. 8.

Naqvi I. H. et. al.: 'Experimental validation of time reversal ultrawide-band communication system for high data rates', JET Microwaves Ant. Propag., 2010, vol. 4, pp. 643-650.

Blomgren P., Kyritsi P., Kim A. D., Papanicolaou G. : 'Spatial focusing and intersymbol interference in multiple-input/single-output time reversal communication systems,' IEEE Journal of Oceanic Engineering, 2008, 33, 341-355.

Dezfooliyan A., Weiner A. M. : 'Experimental investigation of UWB impulse response and time reversal technique up to 12 GHz: omni-directional and directional antennas', IEEE Trans. Ant. Propag., 2012, vol. 60, pp. 3407-3415.

Heritage J.P., Weiner A.M., 'Advances in spectral optical code-division multiple-access communications', IEEE Journal of, Sel. Topics in quantum electronics, vol. 13, No. 5, 2007.

Kyritsi P., Stoica P., Papanicolaou G., Eggers P., Oprea A.: 'Time Reversal and Zero-Forcing Equalization for Fixed Wireless Access Channels,' Record of the Thirty-Ninth Asilomar conference on Signals, Systems and Computers, 2005, pp. 1297-1301.

Mckinney J. D., Peroulis D., and Weiner A. M: 'Dispersion limitations of ultrawideband wireless links and their compensation via photonically enabled arbitrary waveform generation,' IEEE Trans. Microw. Theory Tech., 2008, vol. 56, No. 3, pp. 710-719.

\* cited by examiner

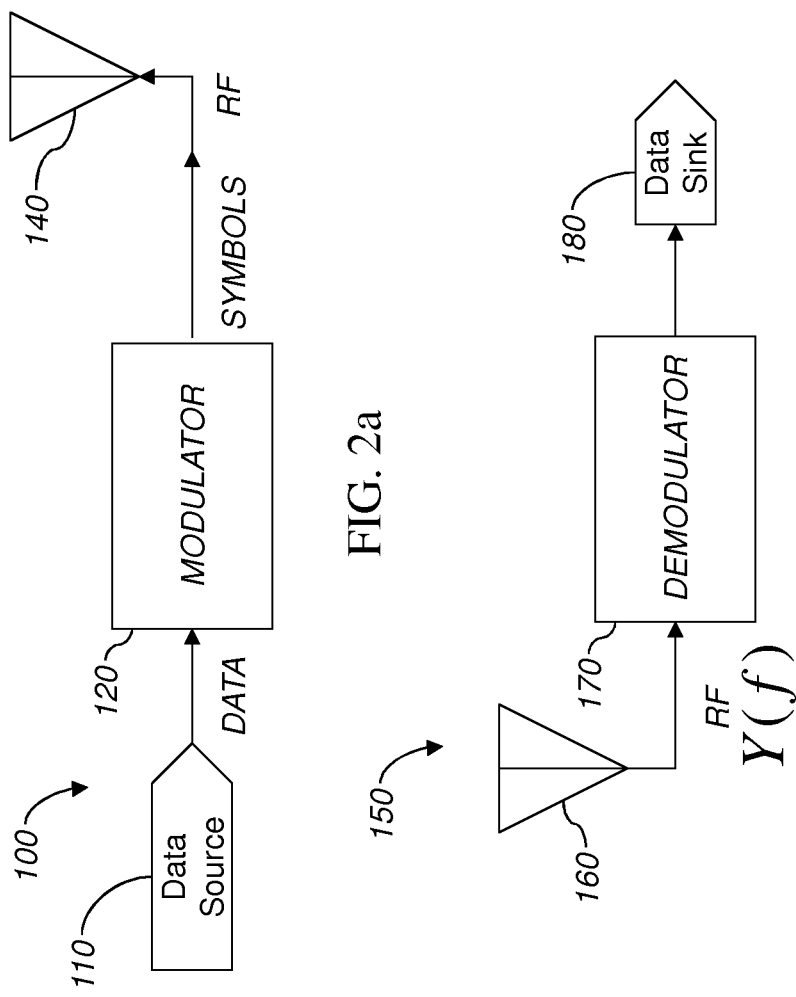

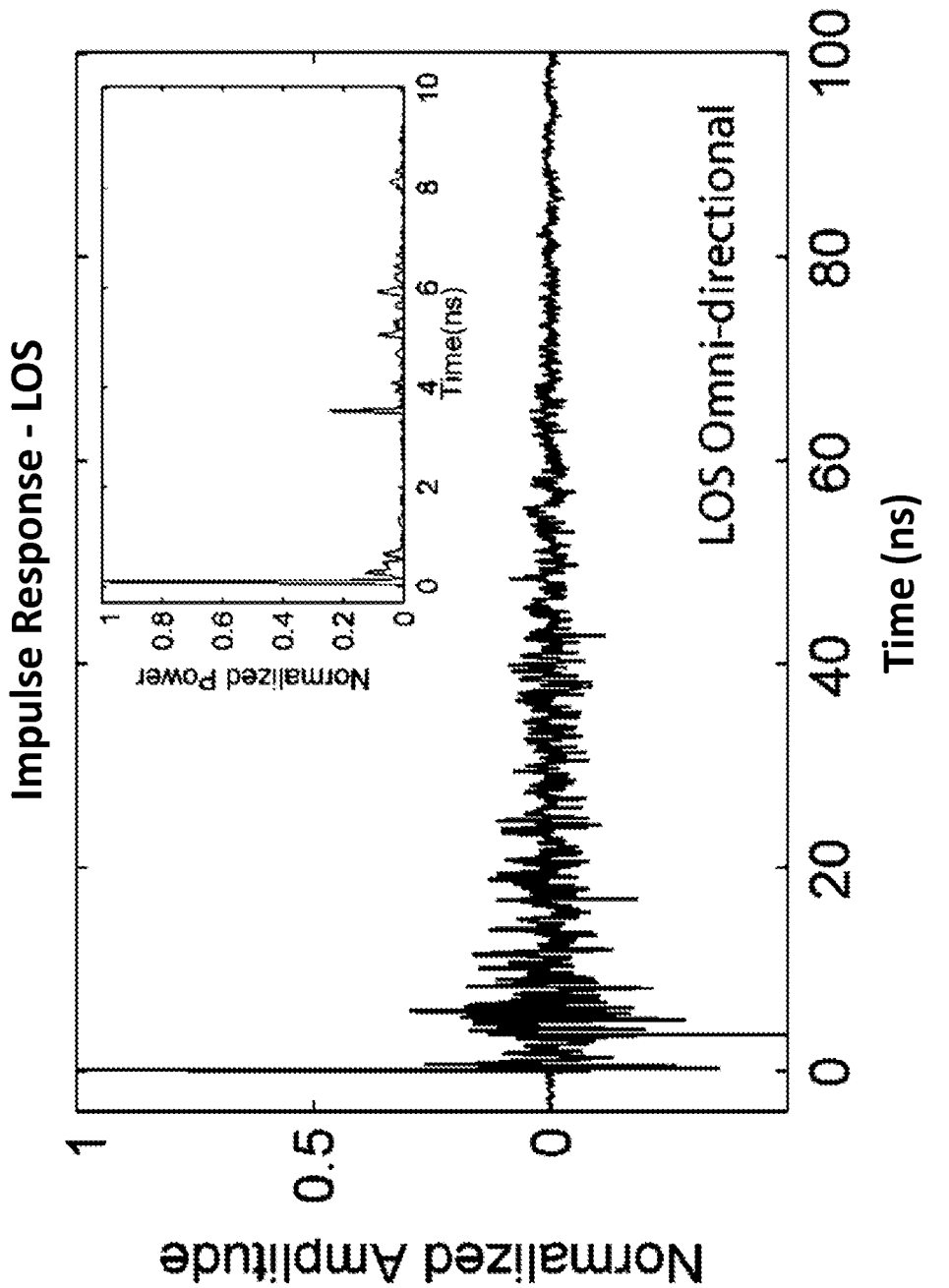

PHASE COMPENSATION FILTERING FOR MULTIPATH WIRELESS SYSTEMS

CROSS-REFERENCE TO RELATED APPLICATIONS

The present U.S. patent application is related to and claims the priority benefit of U.S. Provisional Patent Application Ser. No. 61/862,597, filed Aug. 6, 2013, the contents of which are hereby incorporated by reference in their entirety into the present disclosure.

STATEMENT REGARDING GOVERNMENT FUNDING

This invention was made with government support under N00244-09-1-0068 awarded by the Naval Postgraduate School. The government has certain rights in the invention.

TECHNICAL FIELD

The present application relates to radio-frequency (RF) transmission of data, and specifically to improving the performance of RF systems.

BACKGROUND

This section introduces aspects that may help facilitate a better understanding of the disclosure. Accordingly, these statements are to be read in this light and are not to be understood as admissions about what is or is not prior art.

Radio-frequency (RF) transmission is widely used in systems such as radar, sensing, wireless communications, and electronic warfare. However, many RF applications are required to cope with noise, multipath dispersion and interference with other RF signal(s). For example, ultra-wideband (UWB) systems operate in a wide frequency band, e.g., 3.1-10.6 GHz. Over this range, signals propagate through and around obstacles by various paths, and those paths can be frequency-dependent. Accordingly, multi-path interference can affect many UWB systems and limit their performance severely.

To combat this type of interference, different pre-equalizers such as Time Reversal (TR) or Minimum Mean Square Error (MMSE) have been proposed, each with its own drawbacks. For example, TR pre-filtering (i.e., pre-equalizing) modifies the transmitted signal based on characteristics of the channel between the transmitter (Tx) and the receiver (Rx) so that the received signal will exhibit reduced corruption compared to a non-pre-filtered transmission. Although TR is computationally simple and maximizes the power in the central peak, it shows a poor performance in sidelobe suppression which becomes important in different applications including high-speed communications. TR signals, when received, include excessive sidelobes that can increase the bit-error rate (BER) of the system due to intersymbol interference (ISI). These sidelobes cannot be significantly suppressed using a TR-based system. There is a limit, therefore, to BER improvement that TR can attain for a given bit rate, and increasing signal-to-noise ratio (SNR) cannot improve the BER performance any further. The MMSE equalizers provide a superior multipath suppression performance compared to TR, but their main drawback is the high implementation complexity (with complexity $O(N^3)$ where N is the number of channel taps) which becomes practically important in ultra-broadband systems with large number of tabs.

There is, therefore an unmet need for a novel approach for both line of sight and non-line of sight applications in multipath systems that suffer from high BER and ISI.

SUMMARY

A method for communicating over a wireless link is disclosed. The method includes a transmitter accepting data to transmit. The method also includes the transmitter modulating the accepted data. In addition, the method includes the transmitter applying a pre-filter to the modulated data using a phase compensation topology based on channel characteristics between the transmitter and a receiver. The method also includes the transmitter transmitting the pre-filtered data via an antenna. The frequency response of the pre-filter is based on spectral phase information of the channel transfer function such that the frequency response at the receiver is proportional to the magnitude of the channel frequency response.

Another method for communicating over a wireless link is provided. The method includes a transmitter accepting data to transmit, the transmitter modulating the accepted data, the transmitter transmitting the modulated data via a transmitter antenna, a receiver receiving the modulated data via a receiver antenna, and the receiver applying a post-filter to the received data using a phase compensation topology based on channel characteristics between the transmitter and the receiver. The frequency response of the post-filter is based on spectral phase information of the channel such that the frequency response of the post-filtered data is proportional to the magnitude of the channel frequency response.

A wireless communication system is disclosed. The system includes a transmitter. The transmitter includes a data source configured to provide data to be transmitted. The transmitter also includes a modulator configured to modulate the data. Furthermore, the transmitter includes a pre-filter configured to apply a filter to the modulated data generating pre-filtered data. The transmitter also includes a transmitter antenna configured to receive the pre-filtered data and to transmit the pre-filtered data. The pre-filter is based on a phase compensation topology that is based on channel characteristics between the transmitter and a receiver. The frequency response of the pre-filter based on spectral phase information of the channel such that the frequency response at the receiver is proportional to the magnitude of the channel frequency response.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 2a depicts a simple transmitter arrangement where data packets are modulated and transmitted as symbols;

FIG. 2b depicts a simple receiver arrangement where symbols are received and demodulated in order to reconstruct the data packets;

FIG. 4a depicts a graph of normalized amplitude vs. time measured in ns for an impulse response for a transmitted impulse from the transmitter of FIG. 3a where the pre-filter does not provide any pre-filtering in a line of sight arrangement;

Figure 1:
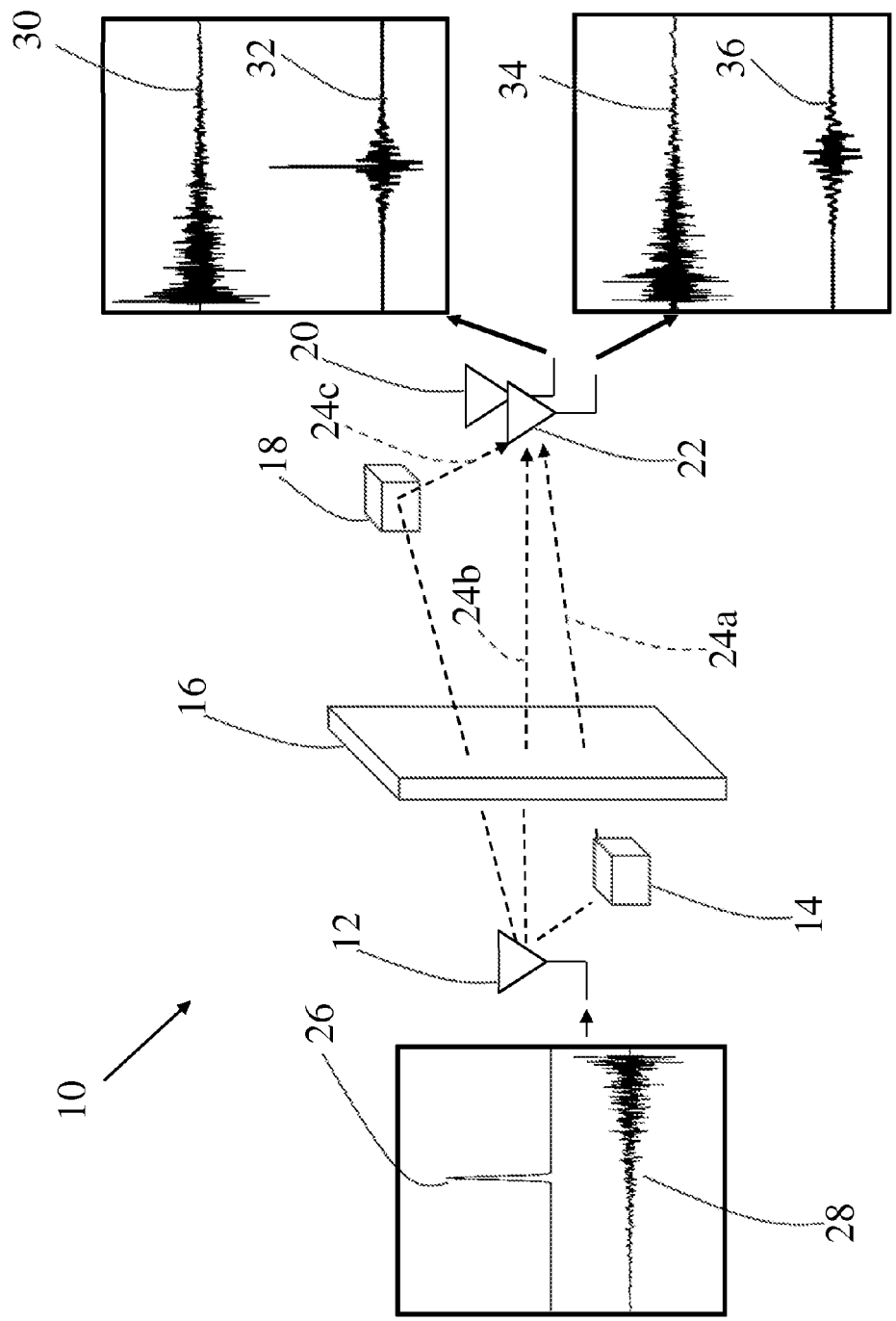
FIG. 1 depicts a typical scenario of multipath channels generated by objects positioned between a transmitter and a receiver, and an exemplary line of sight barrier positioned between the transmitter and the receiver.

The attached drawings are for purposes of illustration and are not necessarily to scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

A novel approach is disclosed for both line of sight and non-line of sight applications in multipath systems that suffer from high bit error rate (BER) and intersymbol interference (ISI).

FIG. 1 depicts a communication system 10 in a typical scenario of multipath channels generated by objects positioned between a transmitter and a receiver, and an exemplary line of sight barrier that is positioned between the transmitter and the receiver. In FIG. 1, two receivers, 20 and 22, are positioned near each other. In the system 10, a transmitter 12 is positioned in relationship to receivers 20 and 22 a distance away with a line of sight barrier 16 positioned therebetween. Objects 14, 16 and 18 generate multipath signals 24a, 24b, and 24c that are received by the two receivers 20 and 22 as received signals 30 and 34 in response to, e.g., a short electronic pulse 26 (i.e., an impulse). As the multipath components arrive from wide angles with different delays and attenuations, details of the received signals 30 and 34 are completely different and they are approximately uncorrelated.

Unless compensated, multipath distortion can severally limit system performance, e.g. data rate in wireless communication channels or range resolution in radar. As shown in FIG. 1, with knowledge of the channel response, the transmit signals can be designed to focus the received RF response in time and space through multipath channels. Temporal focusing means that the transmitted energy adds up coherently at the target receiver, leading to a single short peak with low sidelobes. This peaking translates into a significant signal-to-noise ratio advantage which can be used to dramatically reduce the interference in a high-speed wireless communication system. Spatial focusing means that the spatial profile of the received response decays rapidly away from the target receiver. This leads to low probabilities of intercept and reduced interference in multi-user systems. For example in FIG. 1, when the transmit signal 28 is designed to achieve focusing at receiver 20, a significant peaking 32 is observed at the receiver 20. However, receiver 22 which is positioned about at least two wavelengths away receives only a noise like received response 36.

Referring to FIG. 2a, a simple transmitter arrangement 100 where data packets are modulated and transmitted as symbols, is depicted. The transmitter arrangement 100 has a data source 110 coupled to a modulator 120 which is coupled to an antenna 140. The data source 110 is configured to generate data to be transmitted and the modulator 120 is configured to modulate the data, e.g., by Binary Phase Shift Keying (BPSK), Quadrature Amplitude Modulation (QAM), ON-Off Keying (OOK), pulse-position modulation, or other modulation schemes. The result is a sequence of symbols to be transmitted, each having an associated time and amplitude. The symbol stream can include, e.g., pulses to be transmitted at specific times. Referring to FIG. 2b, a complementary receiver arrangement 150 is depicted. The receiver arrangement 150 includes an antenna 160 configured to receive the symbols Y(f) and a demodulator 170 configured to demodulate received symbols using a complementary demodulation scheme as the modulation scheme implemented in the modulator 120 (see FIG. 2a), where symbols are demodulated back to data packets which are then provided to a data sink 180.

In various examples, modulator 120 can provide a baseband signal, or can be omitted and a sequence of data transmitted and then received directly from data source 110. For example, some UWB systems do not use a carrier. In various aspects, data source 110 and modulator 120 are replaced with a broadband RF source.

Figure 3A:
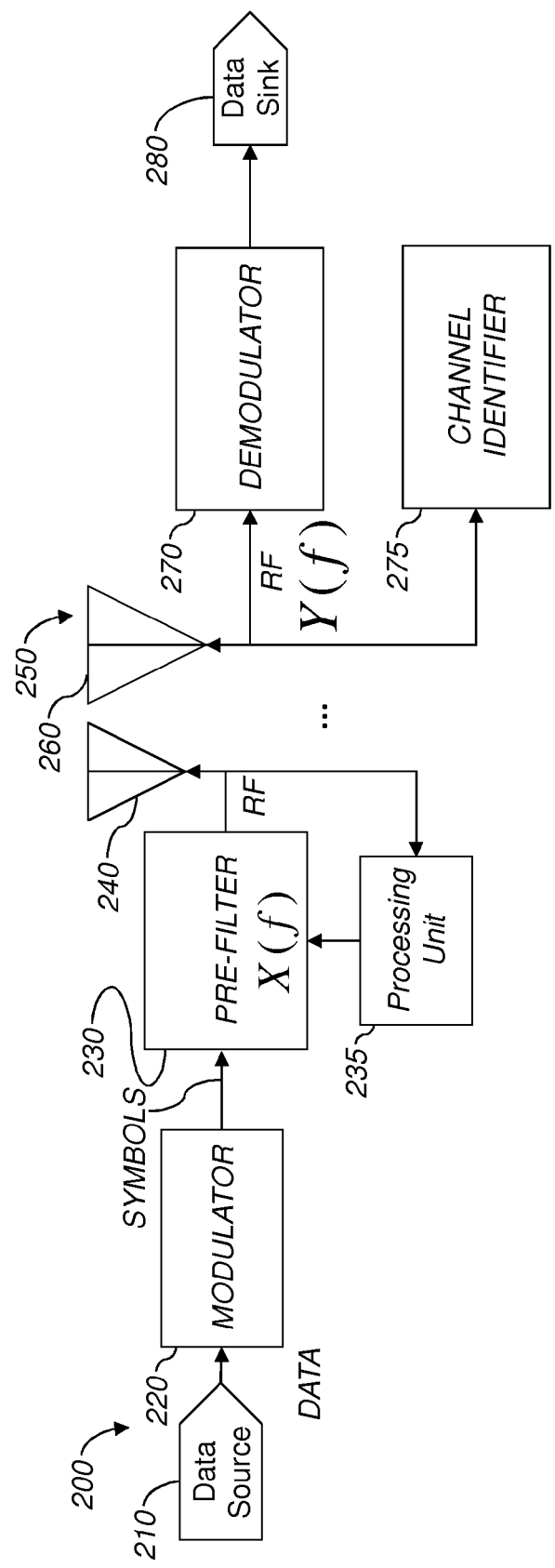
FIG. 3a depicts a transmitter-receiver arrangement according to the present disclosure where data packets are modulated and pre-filtered in a pre-filter according to the channel characteristics between the transmitter and the receiver prior to being transmitted as symbols and where symbols are received and demodulated in order to reconstruct the data packets.

Referring to FIG. 3a, a transmitter arrangement 200, according to the present disclosure is provided. The transmitter arrangement 200 includes a data source 210 coupled to a modulator 220 which is coupled to a pre-filter 230 which is then coupled to an antenna 240. The data source 210 is configured to generate data to be transmitted and the modulator 220 is configured to modulate the data, e.g., by BPSK, QAM, OOK, pulse-position modulation, or other modulation schemes. The result is a sequence of symbols to be transmitted, each having an associated time and amplitude. The symbol stream can include, e.g., pulses to be transmitted at specific times. The pre-filter 230 is configured to modify the symbols to account for the characteristics of the channel including all objects causing multipath channels. The pre-filter 230 characteristics change based on the channel state information which is constantly updated at an appropriate pace depending on the channel variation rate. The channel identifier 275 estimates the channel state information in response to a channel identification signal, e.g., an impulse or spread spectrum signal, sent by the transmitter arrangement 200. The receiver arrangement provides a description of the channel between the transmitter arrangement 200 and the receiver arrangement 250. Accordingly, the channel identifier 275 is coupled to the antenna 260 and is configured to receive the channel identification data received by the receiver arrangement 250 in response to the channel identification signal transmitted by the transmitter arrangement 200. Based on the channel state information provided from the channel identifier 275 to the transmitter 200, the processing unit 235 calculates characteristics of the pre-filter 230 and updates the pre-filter 230 continuously.

Further referring to FIG. 3a, a complementary receiver arrangement 250 is depicted. The receiver arrangement 250 includes an antenna 260 configured to receive the symbols Y(f) and a demodulator 270 configured to demodulate received symbols using a complementary demodulation scheme as the modulation scheme implemented in the modulator 220, where symbols are demodulated back to data packets which are then provided to an data sink block 280. As discussed above the receiver arrangement 250 also includes a channel identifier 275 which is coupled to the antenna 260.

The channel identifier 275 receives the channel identification signal from the antenna 260 corresponding to the channel identification signal transmitted from the transmitter arrangement 200 and in response thereto provides a signal indicative of the channels characteristics, including multipath dispersions.

The pre-filter unit can be based on various topologies. A time reversal (TR) topology has been already discussed in the prior art. In the present disclosure, a novel phase compensation (PC) topology is discussed. A special emphasis of the present disclosure is to compare the capabilities of PC and TR pre-filters over indoor multipath channels in different regards including multipath suppression, spatial-focusing, channel hardening, noise sensitivity, and impact on high-speed data transmission. In the present disclosure, experiments in which TR and PC pre-filters are applied to different measured channel realizations in Line-Of-Sight (LOS) and Non-Line-Of-Sight (NLOS) environments are provided. Temporal compression and peak-to-average power ratio (PAPR) gains of these pre-filters are also calculated and further their sensitivity to the noisy channel estimation is also investigated. To generalize the results, simulations based on 1500 channels using IEEE 802.15.4a model were used. To assess spatial focusing, decay of the received response peak power is investigated as the receiver moves away from the target location.

According to the present disclosure, PC has superior performance in compressing multipath dispersions and focusing the transmitted energy at the target receiver as compared to TR. In evaluating data transmission performances, bit error rates are simulated, based on the measured indoor impulse responses, for received signal-to-noise ratio (SNR) values in the range of −5 to 30 dB. Although TR systems show significant intersymbol interference (ISI) for data rates of 500 Mbps and above (especially in NLOS), PC yields remarkably improved BER which can be used for high-speed transmission of data as fast as 2 Gbps. In general, PC offers a novel approach for a lower complexity (low computation cost due to the efficient Fast Fourier Transform (FFT) algorithm) alternative for similar pre-filters which have better BER performance compared to TR.

Figure 3B:
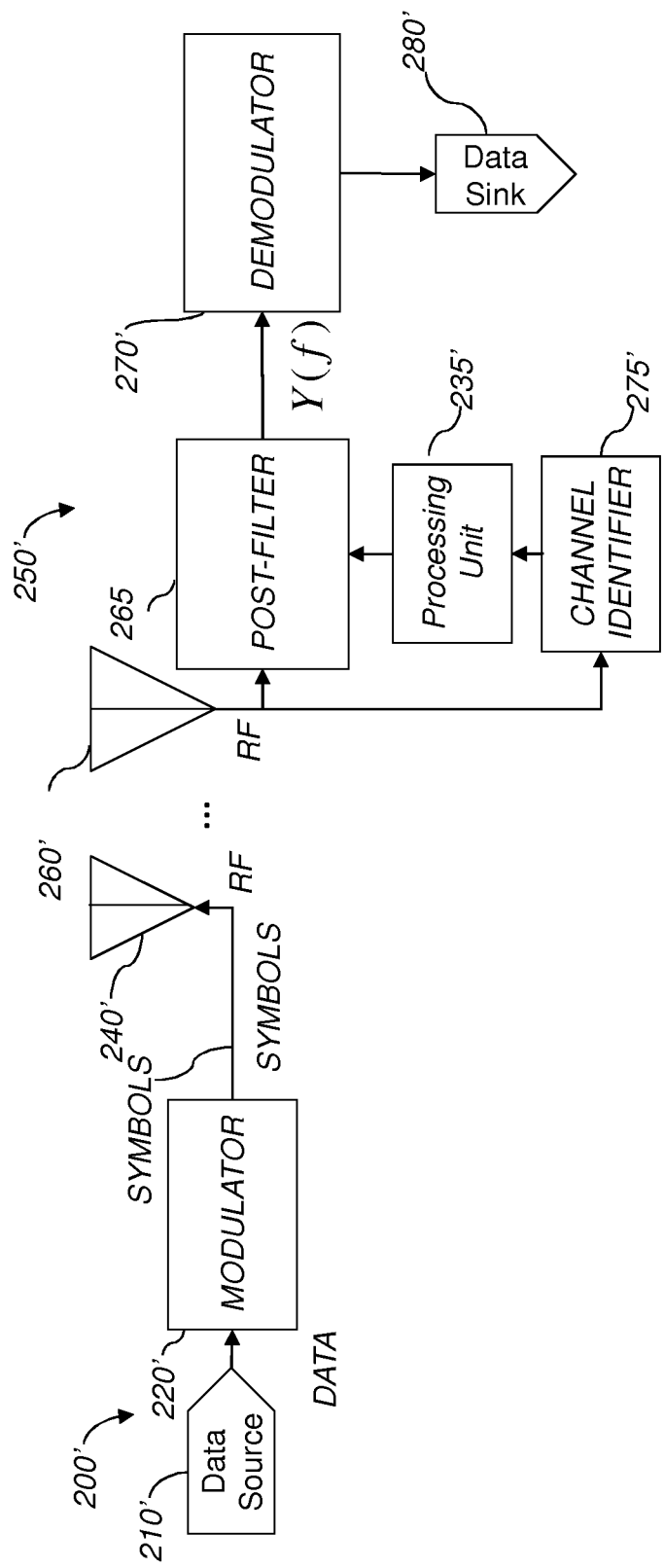
FIG. 3b depicts a transmitter-receiver arrangement according to the present disclosure where data packets are modulated and transmitted as symbols and where symbols are received and post-filtered according to the channel characteristics between the transmitter and the receiver prior to being demodulated in order to reconstruct the data packets.

Referring to FIG. 3b, a transmitter arrangement 200', according to the present disclosure is provided. The transmitter arrangement 200' includes a data source 210' coupled to a modulator 220' which is coupled to an antenna 240'. The data source 210' is configured to generate data to be transmitted and the modulator 220' is configured to modulate the data, e.g., by BPSK, QAM, OOK, pulse-position modulation, or other modulation schemes. The result is a sequence of symbols to be transmitted, each having an associated time and amplitude. The symbol stream can include, e.g., pulses to be transmitted at specific times. The receiver arrangement 250' calculates a description of the channel between the transmitter arrangement 200' and the receiver arrangement 250'. Accordingly, the channel identifier 275' is coupled to the antenna 260' and is configured to calculate the channel identification data received by the receiver arrangement 250' in response to the channel identification signal transmitted by the transmitter arrangement 200'. Based on the channel state information provided from the channel identifier 275' to a post-processing unit 235', the post-processing unit 235' calculates characteristics of the post-filter 265 and updates the post-filter 265 continuously.

Further referring to FIG. 3b, the complementary receiver arrangement 250' is depicted. The receiver arrangement 250' includes an antenna 260' configured to receive the symbols and a the post-filter 265 configured to post-filter the data received by the receiver arrangement 250' in order to account for multipath channels. The receiver arrangement 250' further includes a demodulator 270' configured to demodulate the post-filtered data using a complementary demodulation scheme based on the modulation scheme implemented in the modulator 220', where symbols are demodulated back to data packets which are then provided to a data sink block 280'. As discussed above the receiver arrangement 250' also includes a channel identifier 275' which is coupled to the antenna 260'. The channel identifier 275' receives the channel identification signal from the antenna 260' corresponding to the channel identification signal transmitted from the transmitter arrangement 200' and in response thereto provides a signal indicative of the channels characteristics, including multipath dispersions.

Referring to FIG. 4a, a graph of normalized amplitude vs. time measured in ns for an impulse response for a transmitted impulse from the transmitter of FIG. 3a where the pre-filter does not provide any pre-filtering in a line of sight arrangement is provided. The graph shows the impulse response of a specific (but typical) LOS omni-directional antenna over 200 ns time window. The received response includes different multipath components which extend up to ~100 ns time window. To mitigate the multipath effects, the known topology of TR is first applied as the pre-filter topology.

The received response from TR can be modeled as the autocorrelation of the system impulse response, which is a symmetric waveform. The waveform transmitted under TR ($X_{TR}(f)$) and the resulting received response ($Y_{TR}(f)$) in the frequency domain can be mathematically expressed as:

$$X_{TR}(f) = H_{Sys}*(f) \quad (1)$$

$$Y_{TR}(f) \propto H_{Sys}(f) \cdot X_{TR}(f) = |H_{Sys}(f)|^2 \quad (2)$$

where $H_{Sys}$ is the frequency response of the channel, antennas and amplifiers over the measurement bandwidth. Eq. 2 shows that in the frequency domain, TR can be seen as a pre-matched-filter, which optimizes power allocation over different frequencies in order to maximize the received peak power for a fixed transmitted power.

The time domain representation of the received response, y(t), is provided in equation 3, provided below:

$$y_{TR}(t) = h_{sys}*(-t)*h_{sys}(t) \quad (3)$$

where the * represents the convolution operator.

Figures 4B, 4C:
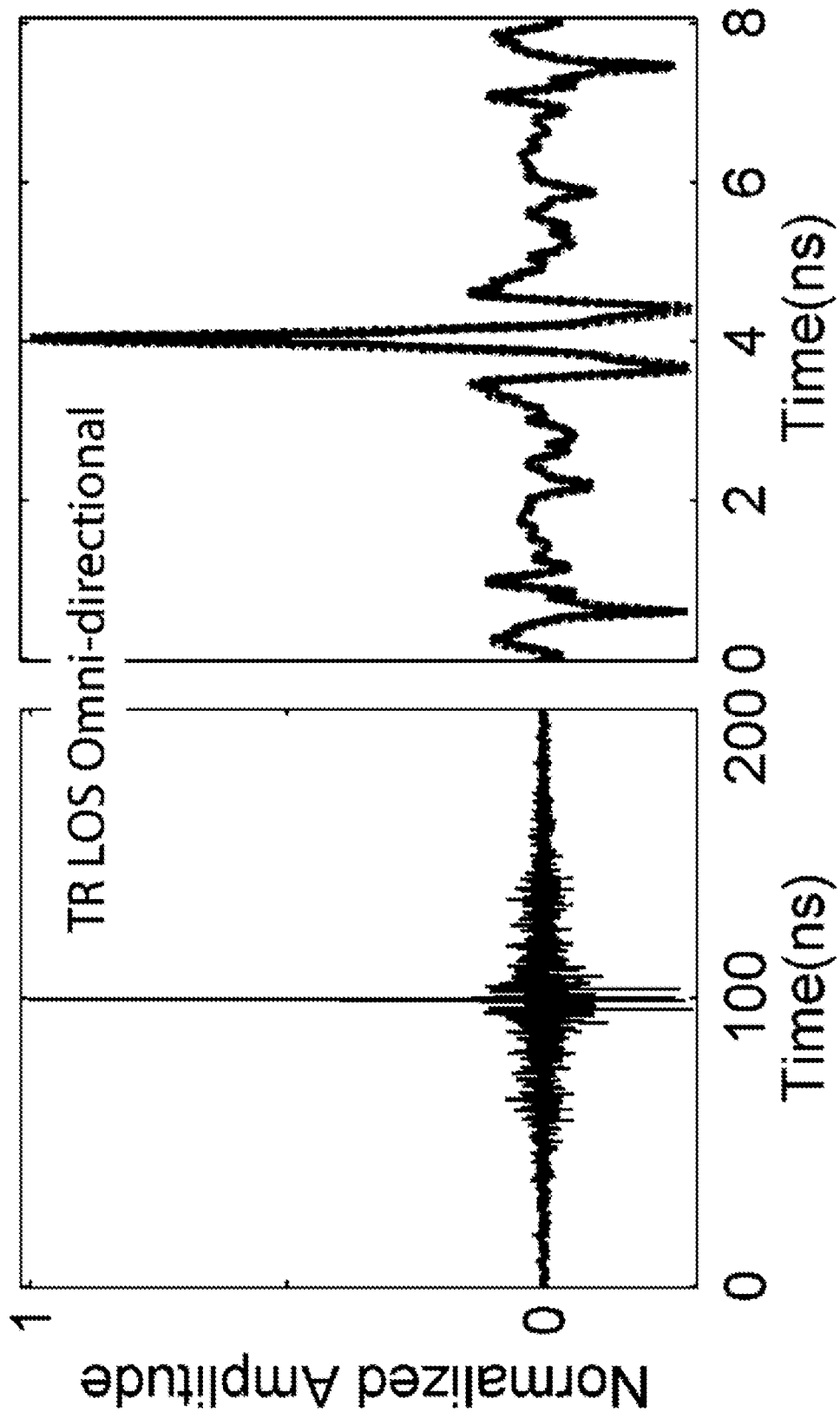
FIG. 4b depicts a graph of normalized amplitude vs. time measured in ns for an impulse response received by the receiver of FIG. 3a where the pre-filter of the complementary FIG. 3a pre-filters the modulated data according to the TR topology using the impulse response where the transmitter and the receiver are provided in a line of sight arrangement.
FIG. 4c depicts an exploded view of the received data depicted in FIG. 4b near the received data corresponding to the transmitted impulse.

Referring to FIG. 4b, a graph of normalized amplitude vs. time measured in ns for a received impulse received by the receiver of FIG. 3a, where the pre-filter of FIG. 3a pre-filters the modulated data according to the TR topology using the impulse response where the transmitter and the receiver are positioned in a line of sight arrangement, is provided. FIG. 4c depicts an exploded view of the received data depicted in FIG. 4b near the central peak of the received data. Although TR maximizes the power in the central peak, it shows a poor performance in temporal sidelobe suppression which becomes important in high-speed communication regime. Particularly, TR has two principal effects on the frequency domain representation of the received signal: 1) compensating the spectral phase distortion, and 2) squaring the spectral magnitude; both as expressed by the mathematical expressions provided above.

The first identified effect results in concentration of power at the center of the received response and reduces the RMS delay spread of the channel. The second effect shapes the power spectrum, increasing roll-off in the spectrum (e.g., at high frequencies) and accentuating sharp spectral variations (peaks, fades, etc.). Both aspects of the second spectral shaping effect correspond to the aggravation of the overall system amplitude distortion and result in time broadening. Based on whether the phase compensation effect or the spectral shaping effect is stronger, the RMS delay spread of the channel can be either increased or decreased by the TR technique.

Since in broadband channels, due to channel multipath effects, transmitted signals reach the receiver via different paths and attenuations. The result of such random delays and the very large bandwidth is significant frequency selectivity with many sharp fades. In addition, over the broadband frequency range, the frequency dependence of the path loss is significant, and channel responses degrade at high-frequency (especially in NLOS scenarios and over long propagation distances). As a result, TR does not show an effective performance in suppression of multipath dispersion, and the received responses from TR have large sidelobes in addition to the main central peak. These sidelobes introduce prohibitively large ISI in high-speed communication channels. Moreover, frequency responses of TR pre-filters roll-off at higher frequencies, which results in a poor spectral efficiency. In an effort to achieve a better performance, researchers in the prior art introduced a modified TR scheme in which the total available bandwidth was divided into N sub-bands. They used 10 different passband filters, and normalized the power of each band by using equal power controls (EPC). Although they achieved a slightly better BER in their modified TR system, this technique cannot flatten sharp fades of the frequency response and, from a practical point of view, adds complexity.

Figure 5A:
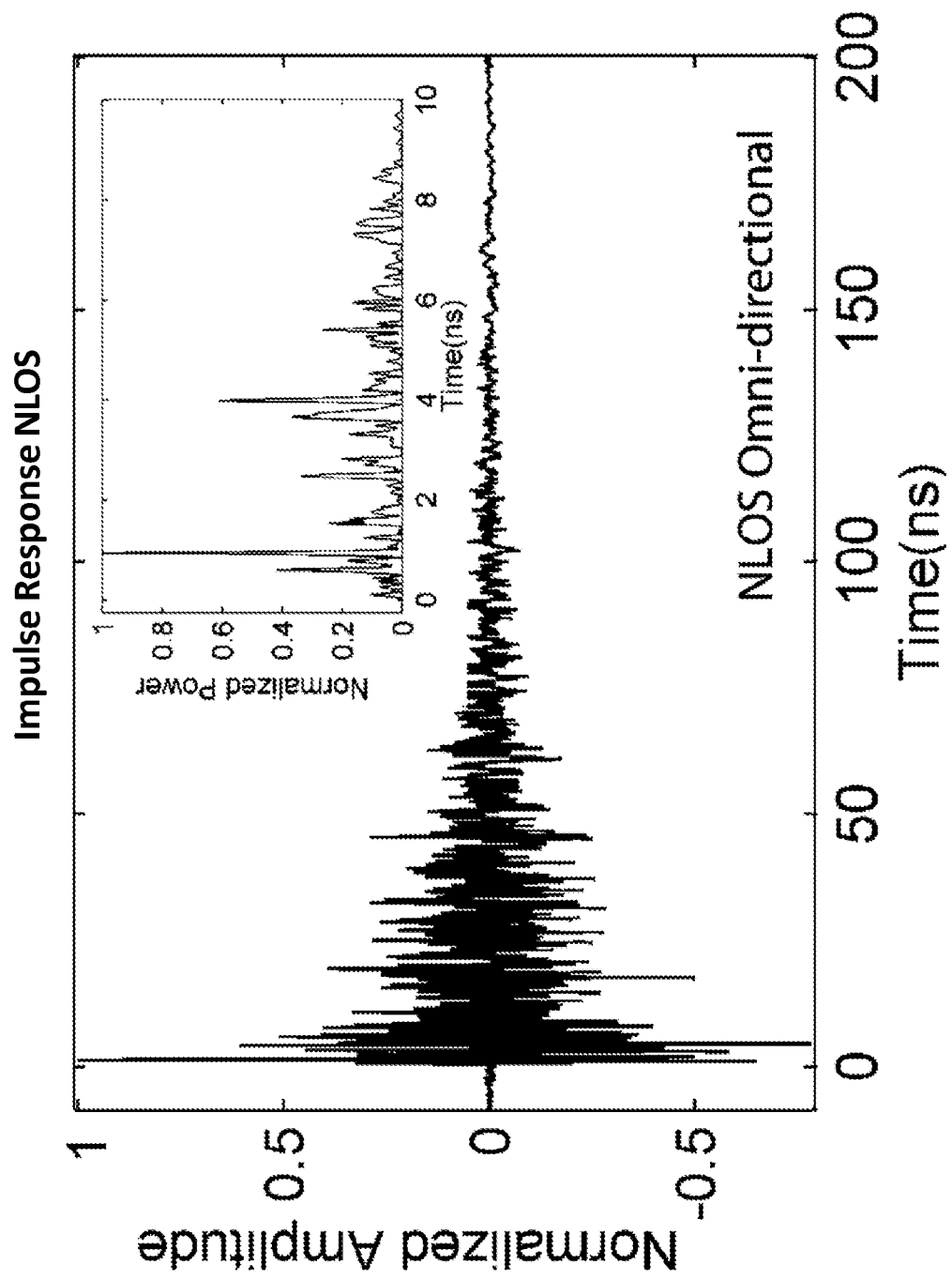
FIG. 5a depicts a graph of normalized amplitude vs. time measured in ns for an impulse response for a transmitted impulse from the transmitter of FIG. 3a where the pre-filter does not provide any pre-filtering in a non-line of sight arrangement.
Figures 5B, 5C:
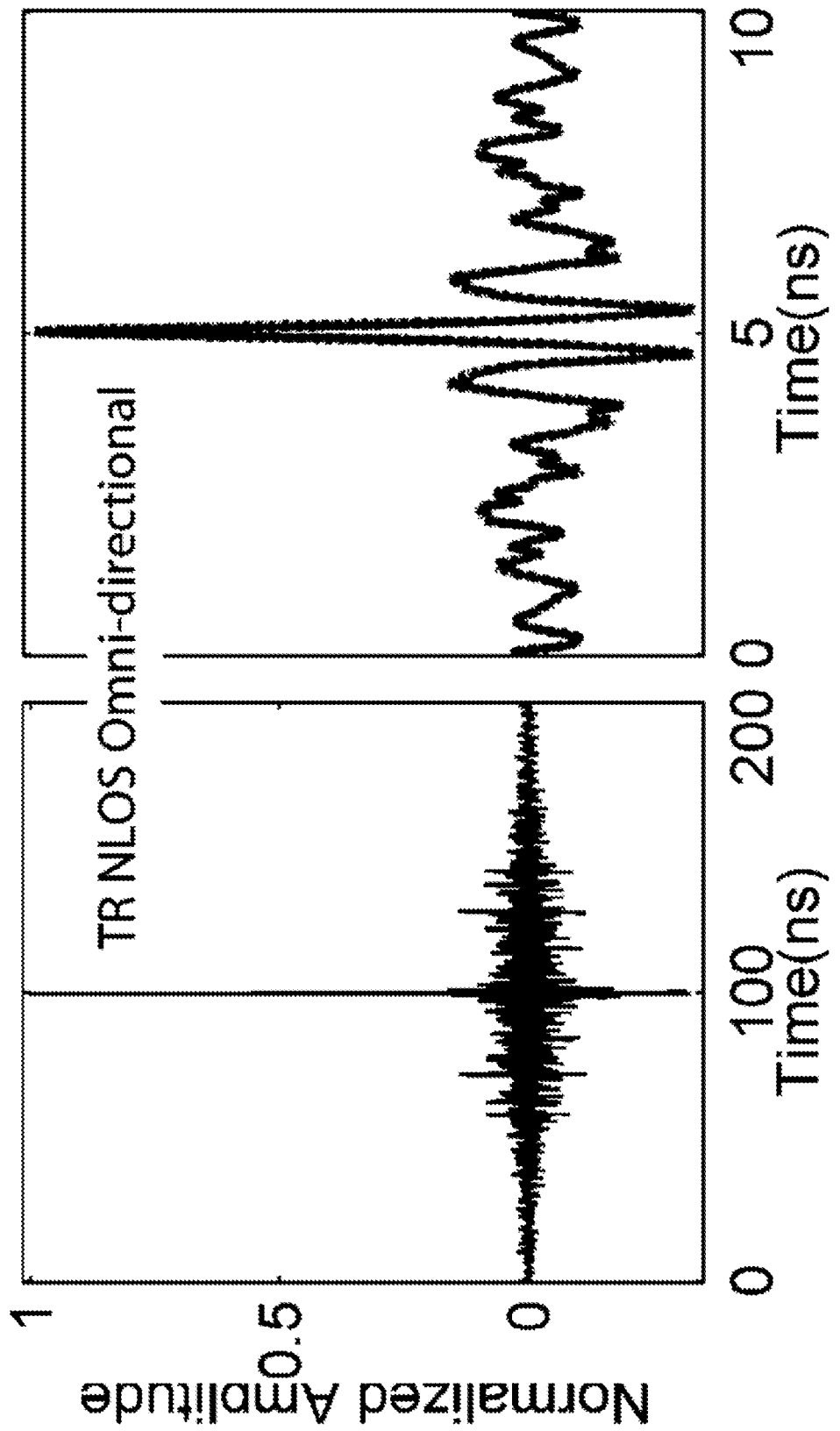
FIG. 5b depicts a graph of normalized amplitude vs. time measured in ns for a received impulse received by the receiver of FIG. 3a where the pre-filter of the complementary FIG. 3a pre-filters the modulated data according to the TR topology utilizing the impulse response to generate the pre-filter characteristics where the transmitter and the receiver are provided in a non-line of sight arrangement.
FIG. 5c depicts an exploded view of the received data depicted in FIG. 5b near the received data corresponding to the transmitted impulse.

Similarly, referring to FIG. 5a, a graph of normalized amplitude vs. time measured in ns for an impulse response for a transmitted impulse from the transmitter of FIG. 3a where the pre-filter does not provide any pre-filtering in a non-line of sight arrangement is provided. The graph shows the impulse response of a specific (but typical) non LOS omni-directional antenna over 200 ns time window. The received response includes different multipath components which extend up to ~100 ns time window. To mitigate the multipath effects, the known topology of TR is first applied as the pre-filter topology. Referring to FIG. 5b, a graph of normalized amplitude vs. time measured in ns for a received impulse received by the receiver of FIG. 3a where the pre-filter of the complementary FIG. 3a pre-filters the modulated data according to the TR topology using the impulse response where the transmitter and the receiver are provided in a non-line of sight arrangement is provided. FIG. 5c depicts an exploded view of the received data depicted in FIG. 5b near the central peak of the received data. Similar to the LOS, there are significant sidelobes in addition to the main central peak.

Next, the phase compensation (PC) topology is applied and the results compared to the TR topology. In the PC topology, the receiver returns to the transmitter, the spectral phase information of the channel transfer function. X(f) which represents the frequency expression for the pre-filter is expressed as provided in equation (4):

$$X_{PC}(f) = \exp(-j \arg(H(f))) \quad (4)$$

where $X_{PC}(f)$ is the frequency response of the pre-filter, and $H(f)$ is the frequency response of the channel, antennas and amplifiers over the measurement bandwidth. The relationship for $Y_{PC}(f)$ can be expressed as the proportionality:

$$Y_{PC}(f) \propto H_{Sys}(f) \cdot X_{PC}(f) = |H_{Sys}(f)| \tag{5}$$

Although the PC topology discussed is mainly focused on the pre-phase compensation which is implemented on the transmitter side (i.e., equalizer on the transmitter side, as shown in FIG. 3a), this equalizer can be applied on the receiver side (post-filter PC, as shown in FIG. 3b). In the post-filter phase compensation, Equation (5) holds for the received responses after the equalizer.

Equation (5) indicates PC compensates the spectral phase of the system transfer function, and $Y_{PC}$ is equal to the magnitude of the $H_{Sys}$. Compared to the TR received response (Eq. (2)), PC does not square the spectral magnitude of the channel response (amplitude distortion aggravation), and as a result, intuitively a better temporal sidelobe suppression performance should be achieved by PC technique.

Figure 6:
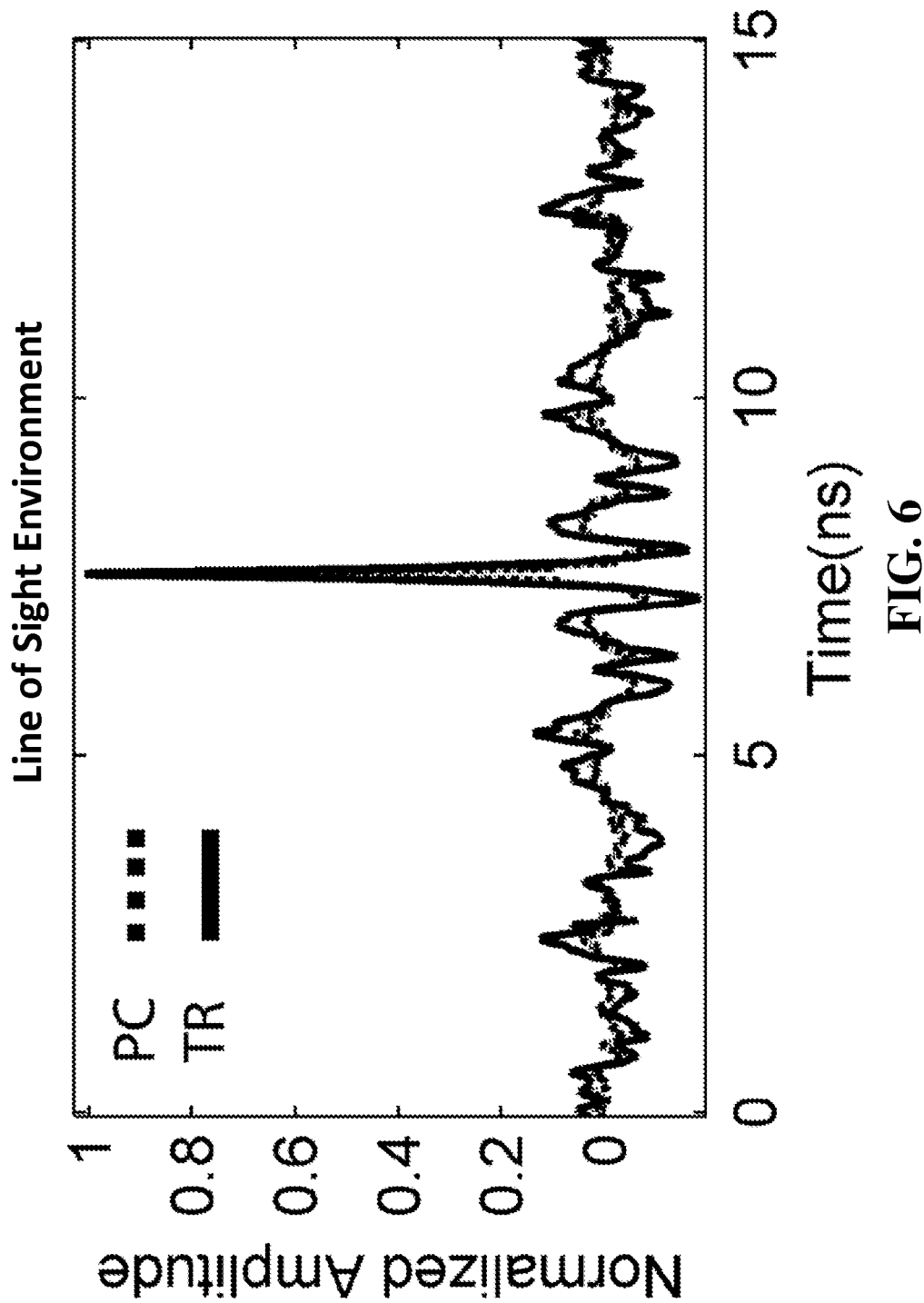
FIG. 6 depicts a normalized amplitude vs. time measured in ns for a received impulse received by the receiver of FIG. 3a where the pre-filter of the complementary FIG. 3a pre-filters the modulated data according to both the TR topology and a phase compensation (PC) topology utilizing the impulse response to generate the pre-filter characteristics where the transmitter and the receiver are provided in a line of sight arrangement.
Figure 7:
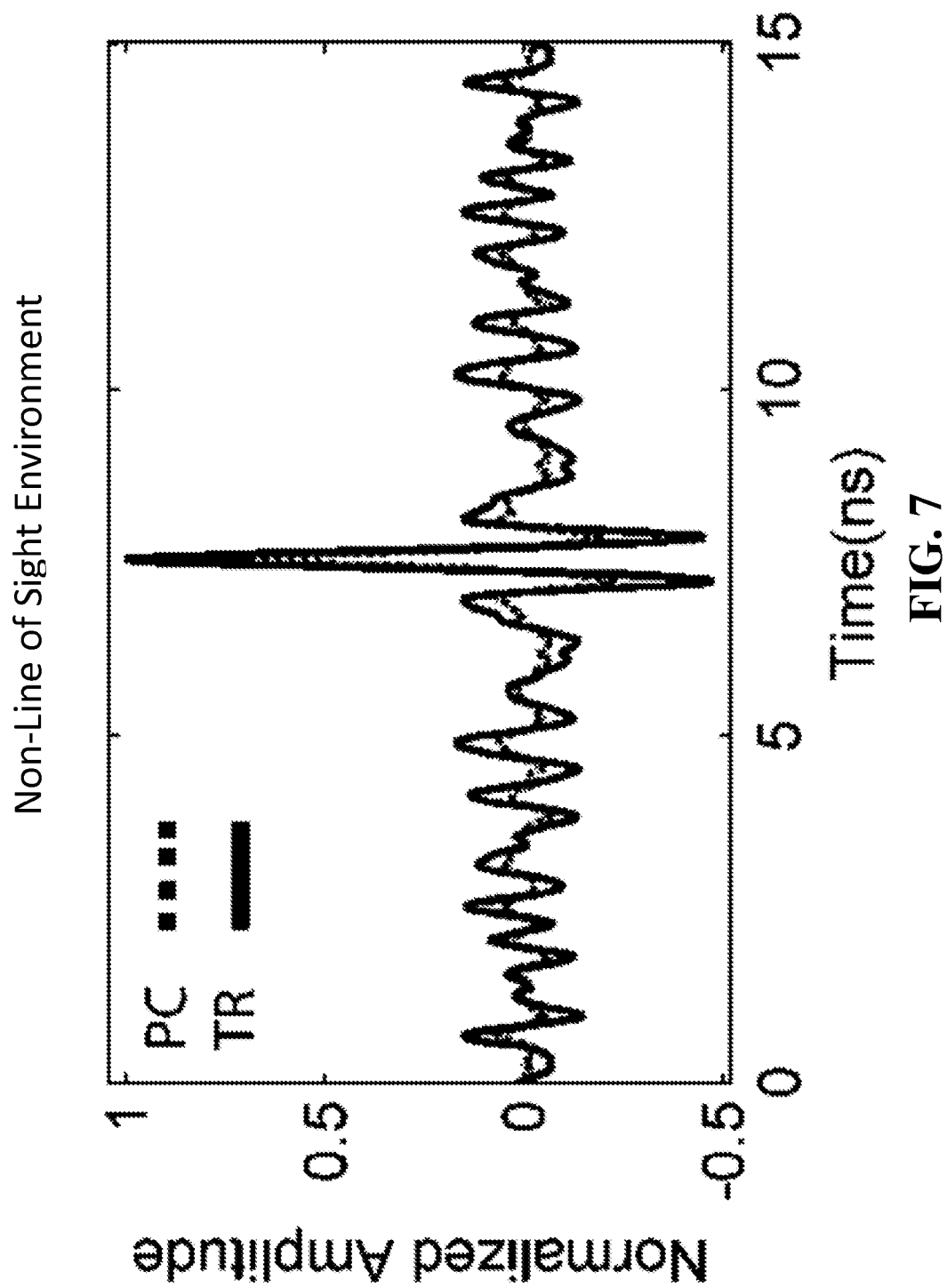
FIG. 7 depicts a normalized amplitude vs. time measured in ns for a received impulse received by the receiver of FIG. 3a where the pre-filter of the complementary FIG. 3a pre-filters the modulated data according to both the TR and the PC topologies utilizing the impulse response to generate the pre-filter characteristics where the transmitter and the receiver are provided in a non-line of sight arrangement.

Referring to FIG. 6, a normalized amplitude vs. time measured in ns for a response received by the receiver of FIG. 3a where the pre-filter of the complementary FIG. 3a pre-filters the modulated data according to both the TR topology and a phase compensation (PC) topology utilizing the impulse response to generate the pre-filter characteristics where the transmitter and the receiver are provided in a line of sight arrangement is provided. A key point in FIG. 6 is that sidelobes for PC are considerably smaller compared to those for TR. Similarly, referring to FIG. 7, a normalized amplitude vs. time measured in ns for a response received by the receiver of FIG. 3a where the pre-filter of FIG. 3a pre-filters the modulated data according to both the TR topology and a phase compensation (PC) topology utilizing the impulse response to generate the pre-filter characteristics where the transmitter and the receiver are provided in a non-line of sight arrangement is provided. Again, a key point in FIG. 7 is that sidelobes for PC are considerably smaller compared to those for TR.

Line-of-sight (LOS) and non-line-of-sight (NLOS) impulse response, time reversal and phase compensation measurements were repeated over a rectangular grid to observe more channel realizations. Average full width half maximum (FWHM) durations of the LOS PC and LOS TR responses are, respectively, 80 ps and 121 ps. The larger FWHM duration observed for TR arises because the received signal falls off more rapidly with frequency due to the squaring operation in Eq. (2). In NLOS environments, the FWHM of the PC and TR responses are, respectively, 119 ps and 202 ps. These values are larger compared to the corresponding LOS values which is consistent with increased loss for the higher frequencies. To better characterize these findings the following equations are presented for root mean square (RMS) delay spread ($\sigma$) (measured in ns), temporal compression ($C_{rms}$), peak to average power ratio (PAPR) ($\theta$) measured in dB, and PAPR gain measured also in dB ($G_\theta$).

$$\sigma \equiv \left[ \frac{\int_0^\infty d\tau (\tau - \bar{\tau})^2 |s(\tau)|^2}{\int_0^\infty d\tau |s(\tau)|^2} \right]^{1/2} \tag{6}$$

where $$\bar{\tau} \equiv \frac{\int_0^\infty d\tau\, \tau |s(\tau)|^2}{\int_0^\infty d\tau |s(\tau)|^2},$$

$$C_{rms} = \frac{\sigma_{IR} - \sigma_{TR}}{\sigma_{IR}} \times 100, \tag{7}$$

$$\vartheta = 10 \log \left( \frac{\max\{|s(t)|^2\}}{\frac{1}{T}\int_0^T dt |s(t)|^2} \right), \tag{8}$$

$$G_\vartheta = \vartheta_{TR} - \vartheta_{IR}, \tag{9}$$

where $|s(\tau)|$ is the positive gain of the impulse response of the channel or the received response from TR/PC excitation at delay $\tau$ relative to the first detectable signal, $C_{rms}$ provides a measure of the temporal focusing gain, PAPR is the ratio of the peak to the average power of the waveform presented in decibels, and PAPR gain provides insight about the PAPR gain achieved by implementing various topologies.

In Table I, the average and standard deviation values of the introduced metrics for these measurements under the LOS regime are presented. The average PAPR for TR and PC are increased, respectively, by 1.05 dB and 4.4 dB compared to the IR-PAPR. For TR, the small PAPR gain ($G_\theta$=1.05 dB) indicates TR does not significantly improve the PAPR value. The presence of the dominant LOS component, which is essentially subject to no spectral phase variation, is one of the reasons for this performance PC-RMS delay is more than two times less than the IR-RMS, while for TR it is increased by 7.2%. The negative temporal compression gain ($C_{rms}$=-7.2%) implies single-input single-out (SISO) TR cannot decrease the RMS delay spread of the channel, which is consistent with the predicted results by simulations. The broadening effect of SISO-TR (squaring the spectrum magnitude) counteracts and may even exceed the compression effect (spectral phase compensation); overall, TR does not reduce the RMS delay spread of the channel. However, for PC pre-filtering spectral phase compensation is the only effect present, and the observed compression gain is significantly larger. In short, PC not only in average reduces RMS delay of the channel to 49% of its original value, but also gives a 4.4 dB PAPR gain. In NLOS environments, the TR and PC performances are improved compared to the LOS scenario. For instance, the PAPR gains are respectively ~6.4 dB and ~7.7 dB higher for NLOS TR and PC compared to the corresponding LOS values. Absence of the undistorted LOS component is the main reason for this improvement. However, although TR provides PAPR gain, it still gives only modest time compression. The RMS delay of PC is 69% shorter and its PAPR value is 12.13 dB larger than the corresponding NLOS IR values. These values for the TR are only 15.8% and 7.46 dB which again point to superior performance of PC technique.

TABLE I

Average (Avg) and standard deviation (Std) values for omni-directional experiments over 15 LOS and 15 NLOS locations. In the text, impulse response metrics are referred by "IR-Metrics Name". TR and PC notations are respectively used for time reversal and phase compensation metrics.

| Environment | Experiment | RMS delay $\sigma$ (ns) | | PAPR $\nu$ (dB) | | FWHM (ps) | | Temporal Compression Gain $C_{rms}$ (%) | | PAPR Gain $G_\nu$ (dB) | |
|---|---|---|---|---|---|---|---|---|---|---|---|
| | | Avg | Std | Avg | Std | Avg | Std | Avg | Std | Avg | Std |
| LOS | IR | 14.4 | 0.9 | 29.4 | 1.2 | — | — | — | — | — | — |
| | TR | 15.4 | 1.5 | 30.4 | 0.6 | 121 | 7.2 | −7.2 | 10.3 | 1.05 | 1.0 |
| | PC | 7.0 | 2.1 | 33.79 | 0.2 | 80 | 2.6 | 51.2 | 15.1 | 4.4 | 1.1 |
| NLOS | IR | 19.9 | 1.3 | 19.15 | 1.46 | — | — | — | — | — | — |
| | TR | 16.7 | 1.6 | 26.6 | 0.67 | 202.5 | 17 | 15.8 | 7.8 | 7.46 | 1.2 |
| | PC | 6.2 | 1.4 | 31.3 | 0.24 | 119 | 8.6 | 69.0 | 6.03 | 12.13 | 1.3 |

To assess the performance of TR and PC in high-speed data transmission, their BER performances are simulated. The simulation is based on transmitting $10^7$ random bits using BPSK (Binary Phase Shift Keying) modulation over the measured channel realizations. The TR and PC pre-filters are used for combating the multipath channel dispersion. On the receiver side, the received signal is sampled at the peak of PC/TR. Simulations are performed as a function of the received SNR (defined as the maximum received peak power to the noise power in dB scale) over −5 to 30 dB in steps of 1 dB for data rates ranging 125 Mbps to 4 Gbps. The average BER performances are evaluated by averaging the BER of the 15 channel realizations for LOS and 15 channel realizations for NLOS.

Figures 8A, 8B:
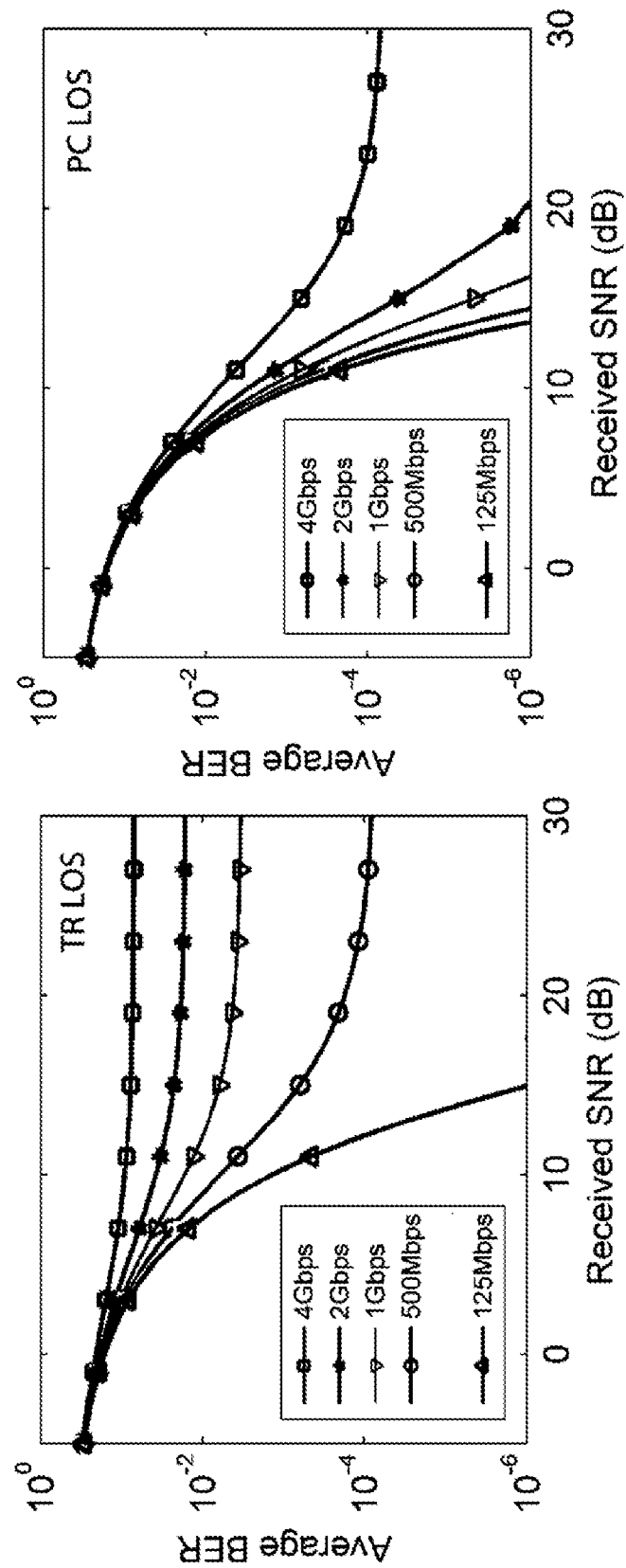
FIG. 8a depicts a graph of average bit error rate (BER) vs. received signal to noise ratio for various data rates ranging from 125 Mbps to 4 Gbps for the TR topology, according to the present disclosure for a line of sight arrangement.
FIG. 8b depicts a graph of average bit error rate (BER) vs. received signal to noise ratio for various data rates ranging from 125 Mbps to 4 Gbps for the PC topology, according to the present disclosure for a line of sight arrangement.

Referring to FIGS. 8a and 8b, graphs of average bit error rate (BER) vs. received signal to noise ratio (SNR) for various data rates ranging from 125 Mbps to 4 Gbps for the TR topology and the PC topology according to the present disclosure for a line of sight arrangement are provided, respectively. Comparing FIGS. 8a and 8b, it becomes apparent that PC outperforms TR considerably in mitigating the multipath channel dispersion. The BER simulations suggest that while the TR performance is prohibitively saturated by its residual intersymbol interference for data rates of 500 Mbps and above, PC can be used for high-speed data transmissions as fast as 2 Gbps in line of sight applications.

Figures 9A, 9B:
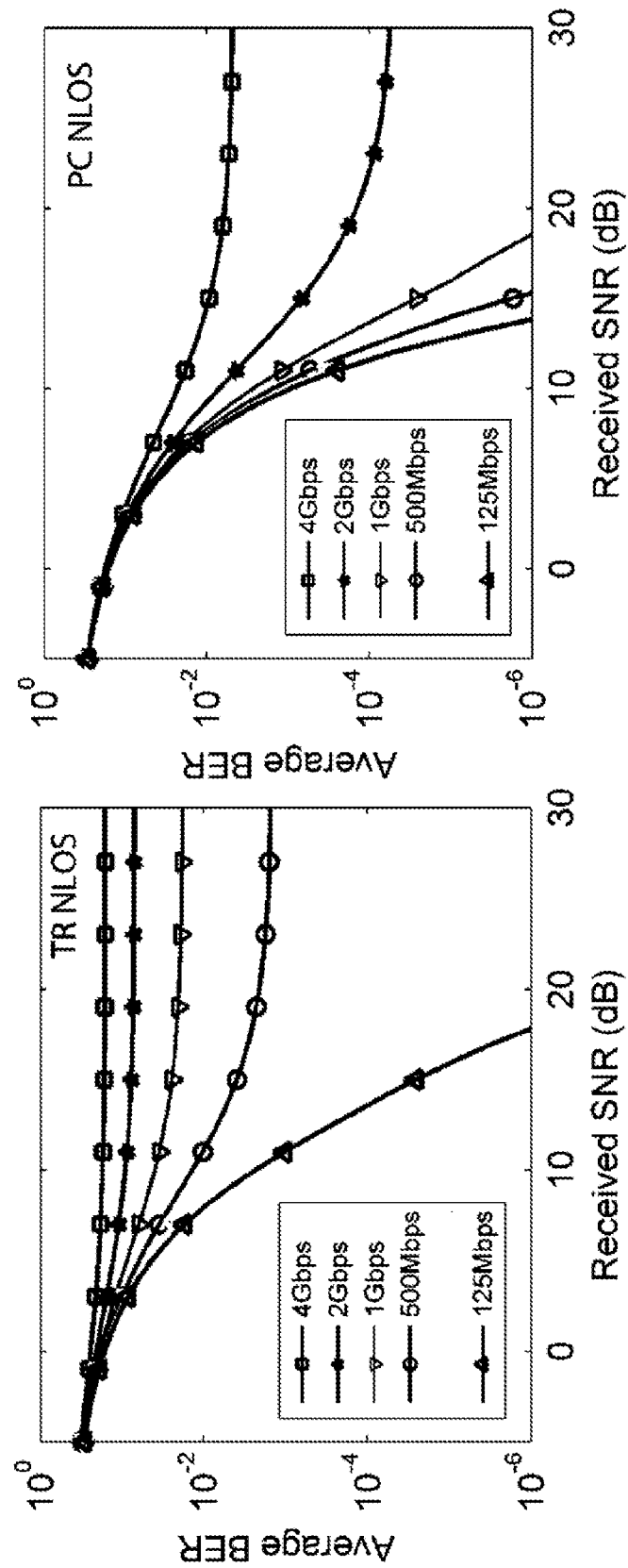
FIG. 9a depicts a graph of average bit error rate (BER) vs. received signal to noise ratio for various data rates ranging from 125 Mbps to 4 Gbps for the TR topology, according to the present disclosure for a non-line of sight arrangement.
FIG. 9b depicts a graph of average bit error rate (BER) vs. received signal to noise ratio for various data rates ranging from 125 Mbps to 4 Gbps for the PC topology, according to the present disclosure for a non-line of sight arrangement.

Referring to FIGS. 9a and 9b, graphs of average BER vs. received SNR for various data rates ranging from 125 Mbps to 4 Gbps for the TR topology and the PC topology according to the present disclosure for a non-line of sight arrangement are provided, respectively. Comparing FIGS. 9a and 9b, it becomes apparent that PC outperforms TR considerably in mitigating the multipath channel dispersion. BER curves have been simulated for data rates in the range of 125-4000 Mbps based on the measured channel responses. TR BER curves exhibit error floors for data rates of 500 Mbps and above, for which ISI saturates system performance. For PC in FIG. 9(b), 2 and 4 Gbps curves level off, respectively, at $10^{-4.25}$ and $10^{-2.3}$ which are considerably better compared to the attained plateau by the corresponding NLOS TR curves ($10^{-1.15}$ for 2 Gbps and $10^{-0.79}$ for 4 Gbps). In general, PC pre-filters have substantially superior performance compared to TR. For instance, BER of 1 Gbps PC is below $10^{-4}$ for SNR larger than ~13 dB; however, for TR technique, this curve floors at $10^{-1.74}$ and better performance cannot be achieved. The BER simulations suggest that while the TR performance is prohibitively saturated by its residual intersymbol interference for data rates of 500 Mbps and above, PC can be used for high-speed data transmissions as fast as 2 Gbps in non-line of sight applications.

Figure 10B:
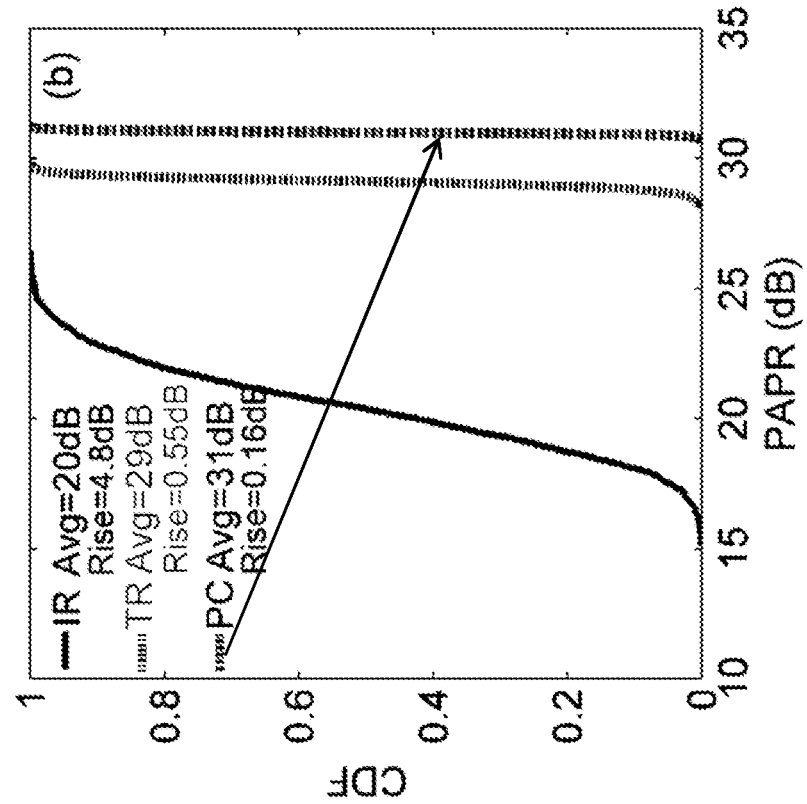
FIG. 10b depicts a graph of the CDF vs. peak-to-average power ratio (PAPR) for the impulse response (IR), and the TR and PC topologies.
Figure 10A:
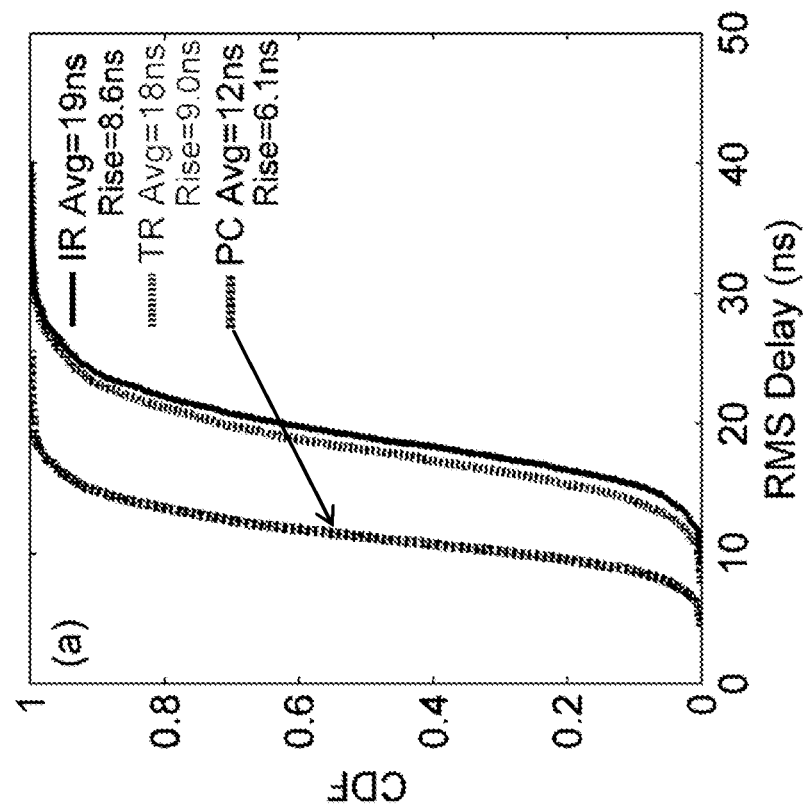
FIG. 10a depicts a graph of cumulative distribution function (CDF) vs. root means square (RMS) for the impulse response (IR), and the TR and PC topologies.

To evaluate capabilities of PC versus TR beyond the measured indoor environments, their performances are compared based on 1500 simulated channels using CM2 IEEE 802.15.4a model (NLOS indoor residential environments). FIGS. 10a and 10b show the cumulative distribution function (CDF) of (a) the RMS delay and (b) the PAPR for impulse response (IR), TR and PC are provided. Both pre-filters provide PAPR gain as well as channel hardening, i.e., reduction of PAPR variations in terms of 10%-90% rise of the CDF. However, PC gives rise to significantly better gain and channel hardening. In terms of RMS delay, PC provides both compression and channel hardening (though much less hardening than is achieved for PAPR). For TR the compression is minimal, and no hardening is apparent. In both cases the simulated temporal compression is smaller than is observed experimentally. This difference can be explained by the fact that IEEE 802.15.4a does not take into account important propagation effects such as distance dependence, random variation of the path loss exponent, and frequency dependence of the path gain.

In strong multipath channels, if two receivers are spaced more than few wavelengths (one wavelength equals ~3 cm for 10 GHz center frequency), their impulse responses are expected to be strongly uncorrelated. As a result, in addition to the temporal focusing which compresses the channels' energy into one central peak, TR and PC also provides spatial focusing.

To evaluate spatial focusing of TR and PC under both full and limited feedback, experiments were again carried out in a NLOS environment (average propagation distance of 15 m). First, the spatial focusing is calculated in the absence of any transmit beamforming. The channel impulse responses are measured as the receive antenna moves with the step size of 2 cm over a 2 m×2 m grid under control of an automatic antenna positioner. As expected, there is no systematic spatial focusing that can be employed in the system design.

Figure 11A:
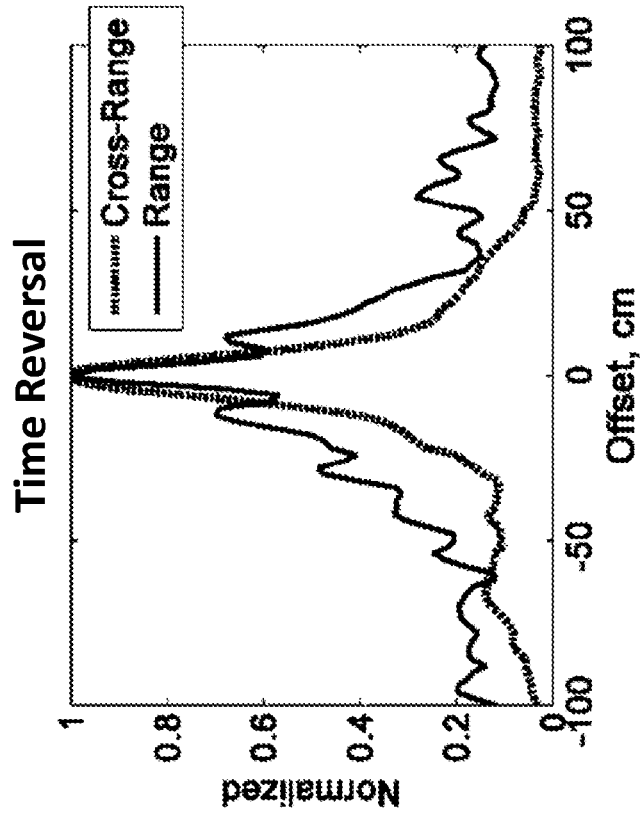
FIGS. 11a, and 11b depict spatial focusing for phase compensation indoor non-line of sight environments (FIG. 11a), and spatial focusing for TR in the same indoor non-line of sight environments (FIG. 11b)
Figure 11B:
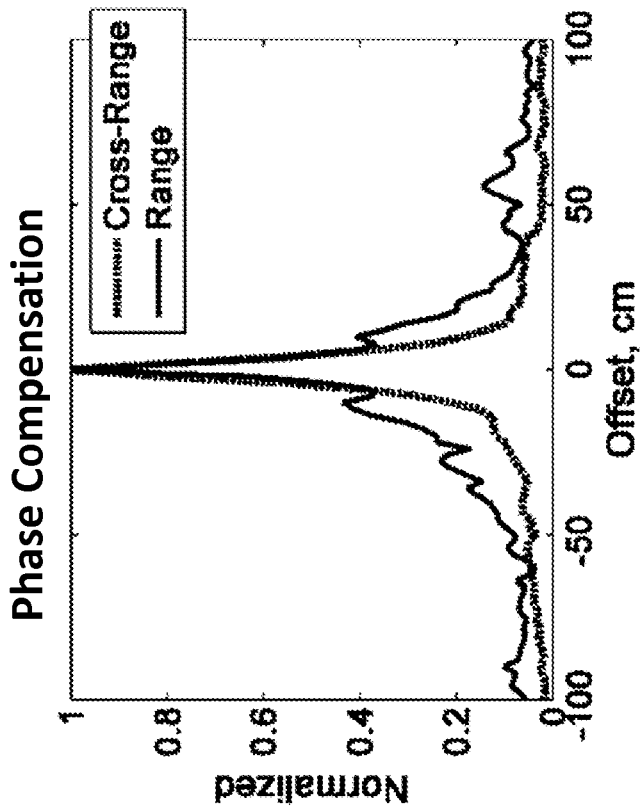

In the next step, the channel is excited with the TR/PC beamformer calculated based on the measured impulse response from Tx to the target receiver which is located at the center of the described automatic antenna positioner. Then, the receive antenna is moved with the step size of 2 cm on the square grid and measure the received peak powers as the receiver is move away from the center location. The line-out plot for each scenario is shown in FIGS. 11a-11b along the range and cross-range axes (i.e. axes respectively parallel and perpendicular to the transmit-receive direction) passing through the center of the antenna positioner. The peak power is focused at the target receiver and decays rapidly away from the center location.

Overall, PC provides a much better spatial focusing compared to TR. For instance, the peak power for TR falls below 3 dB with respect to the main central peak after ~22 cm offset in the range direction while this number is only ~5 cm for PC. The maximum peak power is at least 10 dB lower than the central peak power after 19 cm in the range direction for both full and limited feedback PC. However, this effect does not happen within the 100 cm distance of the central peak for TR. This superior performance of PC can be exploited for the future covert high-speed communication channels as an effective way to provide spatio-temporal focusing and reduce inter-symbol and inter-user interference.

Figure 12:
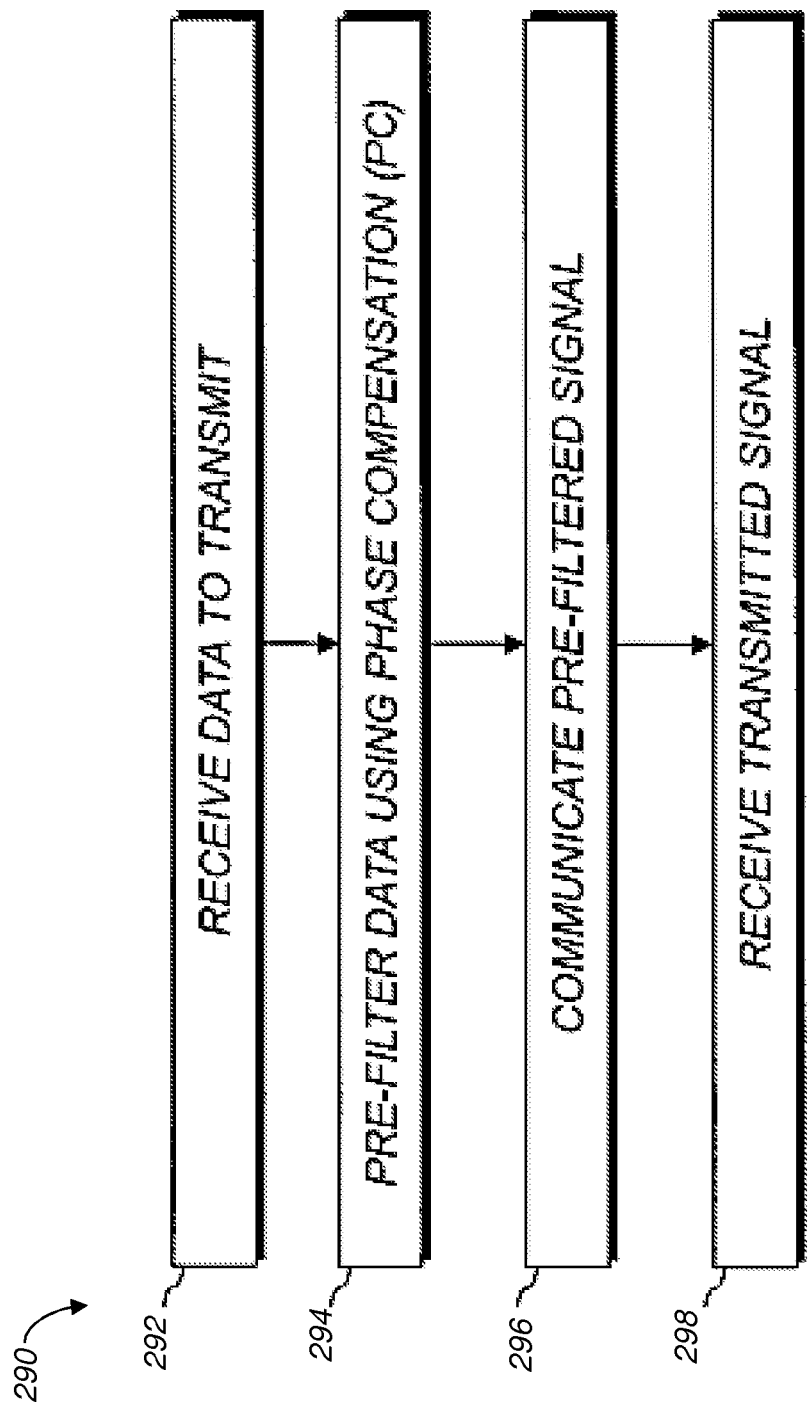
FIGS. 12 and 13 are flowcharts of methods according to various aspects.
Figure 13:
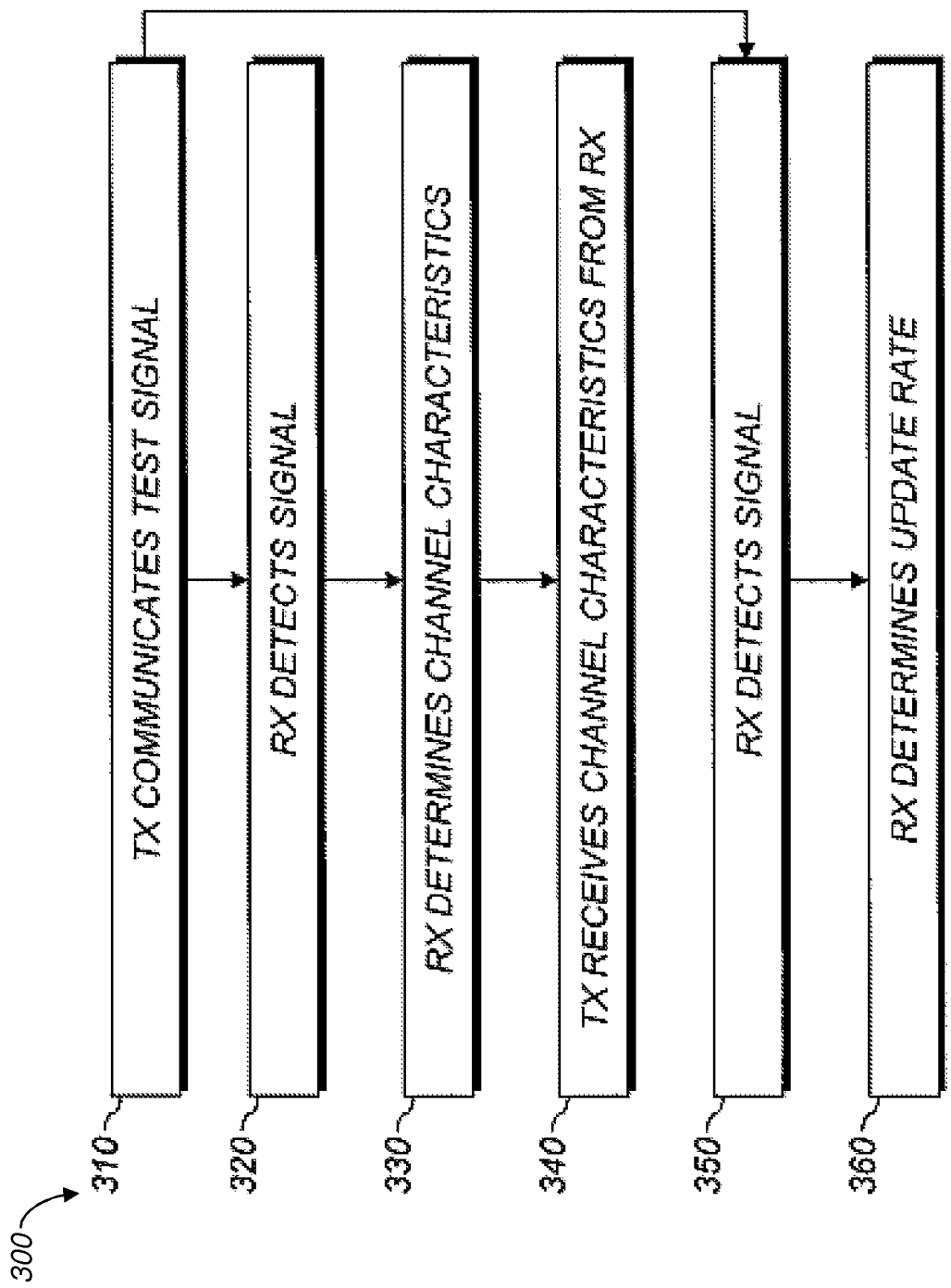

Referring to FIGS. 12 and 13 flowcharts associated with methods of transmission and receiving according to the present disclosure are provided. In FIG. 12, a method 290 is disclosed. The method 290 includes receiving data to be transmitted, as identified by the block 292. The method 290 further includes pre-filtering the data using phase compensation topology, as identified by the block 294. The method 290 further includes communicating the pre-filter data, as indicated by the block 296. Finally, the method 290 includes receiving the transmitted data, as identified by the block 298.

Referring to FIG. 13, a method 300 according to the present disclosure is provided. The method 300 includes the transmitter communicating a test signal (e.g., an impulse or spread spectrum waveform), identified as block 310. The method 300 further includes receiving the test signal, as indicated by the block 320. The method 300 further includes receiver determining the channel characteristics based on the received test signal, as identified by block 330. Furthermore, the method 300 includes receiver transmitting the channel characteristics back to the transmitter (not shown). The method 300 also includes the transmitter receiving the channel characteristics from the receiver, as indicated by the block 340. The method 300 also includes the receiver receiving symbols data transmitted by the transmitter after applying pre-filter, as indicated by the block 350. Finally, the method 300 includes the receiver determining the update rate, as indicated by the block 360, where the rate is updated for channel state information on the transmitter side to account for time varying channels.

Figure 14:
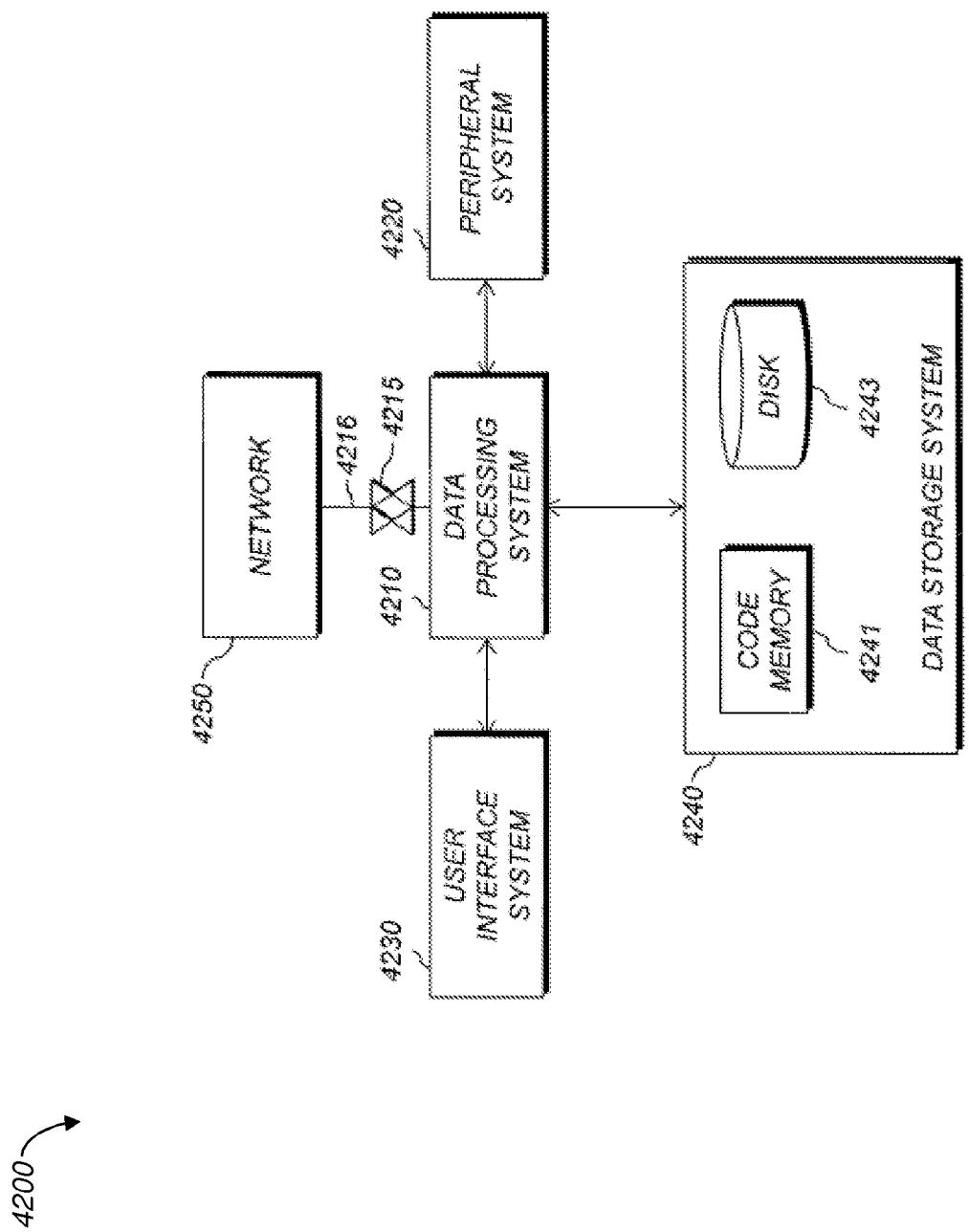
FIG. 14 is a high-level diagram showing the components of a data-processing system.

FIG. 14 is a high-level diagram showing the components of a data-processing system for analyzing data and performing other analyses described herein. The system includes a data processing system 4210, a peripheral system 4220, a user interface system 4230, and a data storage system 4240. The peripheral system 4220, the user interface system 4230 and the data storage system 4240 are communicatively connected to the data processing system 4210. A processor in, e.g., pre-filtering unit 230, FIG. 3a, can each include one or more of systems 4210, 4220, 4230, 4240.

The data processing system 4210 includes one or more data processing devices that implement the processes of the various aspects, including the example processes described herein. The phrases "data processing device" or "data processor" are intended to include any data processing device, such as a central processing unit ("CPU"), a desktop computer, a laptop computer, a mainframe computer, a personal digital assistant, a BLACKBERRY, a digital camera, cellular phone, or any other device for processing data, managing data, or handling data, whether implemented with electrical, magnetic, optical, biological components, or otherwise.

The data storage system 4240 includes one or more processor-accessible memories configured to store information, including the information needed to execute the processes of the various aspects, including the example processes described herein. The data storage system 4240 can be a distributed processor-accessible memory system including multiple processor-accessible memories communicatively connected to the data processing system 4210 via a plurality of computers or devices. On the other hand, the data storage system 4240 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors. In this regard, although the data storage system 4240 is shown separately from the data processing system 4210, one skilled in the art will appreciate that the data storage system 4240 can be stored completely or partially within the data processing system 4210. Further in this regard, although the peripheral system 4220 and the user interface system 4230 are shown separately from the data processing system 4210, one skilled in the art will appreciate that one or both of such systems can be stored completely or partially within the data processing system 4210.

The peripheral system 4220 can include one or more devices configured to provide digital content records to the data processing system 4210. For example, the peripheral system 4220 can include digital still cameras, digital video cameras, cellular phones, or other data processors. The data processing system 4210, upon receipt of digital content records from a device in the peripheral system 4220, can store such digital content records in the data storage system 4240.

The user interface system 4230 can include a mouse, a keyboard, another computer, or any device or combination of devices from which data is input to the data processing system 4210. In this regard, although the peripheral system 4220 is shown separately from the user interface system 4230, the peripheral system 4220 can be included as part of the user interface system 4230.

The user interface system 4230 also can include a display device, a processor-accessible memory, or any device or combination of devices to which data is output by the data processing system 4210. In this regard, if the user interface system 4230 includes a processor-accessible memory, such memory can be part of the data storage system 4240 even though the user interface system 4230 and the data storage system 4240 are shown separately in FIG. 14.

In view of the foregoing, aspects of the disclosure provide reduced BER and improved performance of RF communications. A technical effect is to change the transmitted RF signal to interfere less strongly with various modulation schemes. Another technical effect of various aspects is to transmit a signal that will only be understood by a receiver at a specific location. Processors, e.g., in modulator 120 or pre-filtering unit 130, described above, can include a data processing system 4210 and one or more of systems 4220, 4230, or 4240.

As will be appreciated by one skilled in the art, aspects of the present invention may be embodied as a system, method, or computer program product. Accordingly, aspects of the present invention may take the form of an entirely hardware aspect, an entirely software aspect (including firmware, resident software, micro-code, etc.), or an aspect combining software and hardware aspects that may all generally be referred to herein as a "service," "circuit," "circuitry," "module," or "system." Furthermore, aspects of the present invention may take the form of a computer program product embodied in one or more computer readable medium(s) having computer readable program code embodied thereon.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice method(s) according to various aspect(s).

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, or any suitable combination of appropriate media.

Computer program code for carrying out operations for aspects of the present invention may be written in any combination of one or more programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The user's computer or the remote computer can be non-portable computers, such as conventional desktop personal computers (PCs), or can be portable computers such as tablets, cellular telephones, smartphones, or laptops.

Computer program instructions can be stored in a computer readable medium that can direct a computer, other programmable data processing apparatus, or other devices to function in a particular manner. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those skilled in the art will recognize that numerous modifications can be made to the specific implementations described above. The implementations should not be limited to the particular limitations described and claimed herein. Other implementations may be possible.

The invention claimed is:

1. A method for communicating over a wireless link, the method comprising:
   a transmitter communicating a predefined test signal via an antenna;
   a receiver receiving the test signal;
   the receiver determining channel characteristics based on the received test signal;
   the receiver communicating the determined channel characteristics;
   the transmitter receiving the determined channel characteristics;
   the transmitter using the determined channel characteristics in a pre-filter
   the transmitter accepting data to transmit;
   the transmitter modulating the accepted data;
   the transmitter applying the pre-filter to the modulated data using a phase compensation topology based on the channel characteristics between the transmitter and the receiver; and
   the transmitter transmitting the pre-filtered data via an antenna, the frequency response of the pre-filter based on spectral phase information of the channel such that the frequency response at the receiver is proportional to the magnitude of channel frequency response.

2. The method of claim 1, the predefined test signal is an electrical signal including at least one of an impulse, a short pulse, and a spread spectrum signal.

3. The method of claim 1, the pre-filter frequency response is $\exp(-j\arg(H(f)))$, where $H(f)$ is the frequency response of the channel.

4. The method of claim 1, the channel is established based on a line of sight link between the transmitter and the receiver.

5. The method of claim 1, the channel is established based on a non-line of sight link between the transmitter and the receiver.

6. The method of claim 1, wherein the communication channel includes multipaths.

7. A method for communicating over a wireless link, the method comprising:
   a transmitter accepting data to transmit;
   the transmitter modulating the accepted data;
   the transmitter applying a pre-filter to the modulated data using a phase compensation topology based on channel characteristics between the transmitter and a receiver; and
   the transmitter transmitting the pre-filtered data via an antenna, the frequency response of the pre-filter based on spectral phase information of the channel such that the frequency response at the receiver is proportional to the magnitude of channel frequency response, application of the pre-filter provides spatial focusing for the receiver such that transmitted energy from the transmitter is selectively focused at the receiver and becomes substantially noise like to a second receiver positioned at least two wavelengths away from the receiver.

8. The method of claim 7, the pre-filter frequency response is exp(−jarg(H(f))), where H(f) is the frequency response of the channel.

9. The method of claim 7, the channel is established based on a line of sight link between the transmitter and the receiver.

10. The method of claim 7, the channel is established based on a non-line of sight link between the transmitter and the receiver.

11. The method of claim 7, wherein the communication channel includes multipaths.

12. A method for communicating over a wireless link, the method comprising:
- a transmitter communicating a predefined test signal via an antenna;
- the receiver receiving the test signal;
- the receiver determining channel characteristics based on the received test signal;
- the receiver using the channel characteristics in a post-filter;
- the transmitter accepting data to transmit;
- the transmitter modulating the accepted data;
- the transmitter transmitting the modulated data via the antenna;
- a receiver receiving the modulated data; and
- the receiver applying the post-filter to the received data using a phase compensation topology based on the channel characteristics between the transmitter and the receiver, the frequency response of the post-filter based on spectral phase information of the channel such that the frequency response of the post-filtered data is proportional to the magnitude of the channel frequency response.

13. The method of claim 12, the post-filter frequency response is exp(−jarg(H(f))), where H(f) is the frequency response of the channel.

14. The method of claim 12, the channel is established based on a line of sight link between the transmitter and the receiver.

15. The method of claim 12, the channel is established based on a non-line of sight link between the transmitter and the receiver.

16. The method of claim 12, wherein the transmitted data includes multipaths.

17. A wireless communication system, comprising:
- a transmitter, including:
  - a data source configured to provide data to be transmitted;
  - a modulator configured to modulate the data;
  - a pre-filter configured to apply a filter to the modulated data generating pre-filtered data; and
  - a transmitter antenna configured to receive the pre-filtered data and to transmit the pre-filtered data,
  - the pre-filter based on a phase compensation topology that is based on channel characteristics between the transmitter and a receiver, the frequency response of the pre-filter based on spectral phase information of the channel such that the frequency response at the receiver is proportional to the frequency response of the channel;
- the transmitter is configured to communicate a predefined test signal via the transmitter antenna;
- the receiver is configured to receive the test signal;
- the receiver is configured to determine the channel characteristics based on the received test signal;
- the receiver is configured to communicate the determined channel characteristics;
- the transmitter is configured to receive the determined channel characteristics; and
- the transmitter is configured to store the channel characteristics in the pre-filter.

18. The system of claim 17, the receiver including:
- a receiver antenna configured to receive the transmitted data;
- a demodulator configured to demodulate the received data; and
- a channel identifier configured to receive the received data, and to generate the pre-filter characteristics.

19. The system of claim 17, the pre-filter frequency response is exp(−jarg(H(f))), where H(f) is the frequency response of the channel.

20. The system of claim 17, the channel is established based on a line of sight link between the transmitter and the receiver.

21. The system of claim 17, the channel is established based on a non-line of sight link between the transmitter and the receiver.

22. The system of claim 17, wherein the communication channel includes multipaths.

23. A wireless communication system, comprising:
- a transmitter, including:
  - a data source configured to provide data to be transmitted;
  - a modulator configured to modulate the data;
  - a pre-filter configured to apply a filter to the modulated data generating pre-filtered data; and
  - a transmitter antenna configured to receive the pre-filtered data and to transmit the pre-filtered data;
  - the pre-filter based on a phase compensation topology that is based on channel characteristics between the transmitter and a receiver, the frequency response of the pre-filter based on spectral phase information of the channel such that the frequency response at the receiver is proportional to the frequency response of the channel;
- the pre-filter configured to provide spatial focusing for the receiver such that transmitted energy from the transmitter is selectively focused at the receiver and becomes substantially noise like to a second receiver positioned at least two wavelengths away from the receiver.

24. The system of claim 23, the pre-filter frequency response is exp(−jarg(H(f))), where H(f) is the frequency response of the channel.

25. The system of claim 23, the channel is established based on a line of sight link between the transmitter and the receiver.

26. The system of claim 23, the channel is established based on a non-line of sight link between the transmitter and the receiver.

27. The system of claim 23, wherein the communication channel includes multipaths.

* * * * *